US011036499B2

(12) United States Patent
Madduri et al.

(10) Patent No.: US 11,036,499 B2
(45) Date of Patent: Jun. 15, 2021

(54) SYSTEMS, APPARATUSES, AND METHODS FOR CONTROLLABLE SINE AND/OR COSINE OPERATIONS

(71) Applicant: Intel Corporation, Santa Clara, CA (US)

(72) Inventors: Venkateswara R. Madduri, Austin, TX (US); Elmoustapha Ould-Ahmed-Vall, Chandler, AZ (US); Robert Valentine, Kirvat Tivon (IL); Jesus Corbal, Barcelona (ES); Mark J. Charney, Lexington, MA (US); Carl Murray, Dublin (IE); Milind Girkar, Sunnyvale, CA (US); Bret Toll, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 16/613,537

(22) PCT Filed: Jun. 30, 2017

(86) PCT No.: PCT/US2017/040152
§ 371 (c)(1),
(2) Date: Nov. 14, 2019

(87) PCT Pub. No.: WO2019/005085
PCT Pub. Date: Jan. 3, 2019

(65) Prior Publication Data

US 2020/0073658 A1 Mar. 5, 2020

(51) Int. Cl.
*G06F 9/30* (2018.01)
*G06F 7/548* (2006.01)

(52) U.S. Cl.
CPC ............ *G06F 9/3001* (2013.01); *G06F 7/548* (2013.01); *G06F 9/30036* (2013.01); *G06F 9/30145* (2013.01)

(58) Field of Classification Search
CPC .... G06F 9/3001; G06F 7/548; G06F 9/30036; G06F 9/30145
See application file for complete search history.

(56) References Cited

U.S. PATENT DOCUMENTS 6,421,696 B1 * 7/2002 Horton .................. G06F 17/142 708/404
7,062,637 B2 * 6/2006 Ganapathy ................ G06F 5/00 712/22

(Continued)

OTHER PUBLICATIONS

International Preliminary Report on Patentability, PCT App. No. PCT/US2017/040152, dated Jan. 9, 2020, 9 pages.

(Continued)

*Primary Examiner* — Cheng Yuan Tseng
(74) *Attorney, Agent, or Firm* — Nicholson DeVos Webster & Elliott LLP

(57) ABSTRACT

Embodiments of systems, apparatuses, and methods for performing controllable sine and/or cosine operations in a processor are described. For example, execution circuitry executes a decoded instruction to compute at least a real output value and an imaginary output value based on at least a cosine calculation and a sine calculation, the cosine and sine calculations each based on an index value from a packed data source operand, add the index value with an index increment value from the packed data source operand to create an updated index value, and store the real output value, the imaginary output value, and the updated index value to a packed data destination operand.

20 Claims, 14 Drawing Sheets

VPSINCOSW xmm1, xmm2/m128, imm8
PACKED DATA SOURCE ("SRC") 102
H G F E D C B A
IMMEDIATE VALUE 103
INDEX VALUE 210
SRC1_C[11:0]
SRC1_C[9:2]
SRC1_D[11:0]
12
COS QUADRANT LOOKUP TABLE (LUT) 106
MAPPER CONTROL VALUE 107 (E.G., IMAGINARY COMPONENT CONTROL VALUE 202, AND SCALING VALUE 206, AND REAL COMPONENT CONTROL VALUE 204)
INDEX INCREMENT VALUE 208
SRC1_C[1:0]
INTERPOLATOR 108
SRC1_C[11:10]
MAPPER 110
IMM8[6:2]
ADDER 114
UPDATED INDEX VALUE 232
12
IMM8[1:0]
OUTPUT MUX 112
ADDER[11:0]
EXECUTION CIRCUITRY 105
PACKED DATA DESTINATION (DEST) 104
H G F E D C B A
OUTPUT SELECTOR VALUE 212

(56) References Cited

U.S. PATENT DOCUMENTS

| | | | | |
|---|---|---|---|---|
| 7,260,592 | B2 | 8/2007 | Sheaffer | |
| 7,660,973 | B2 * | 2/2010 | Hansen | G06F 9/30029 712/222 |
| 8,650,240 | B2 * | 2/2014 | Eichenberger | G06F 17/16 708/607 |
| 2004/0103270 | A1 | 5/2004 | Vinnnakota et al. | |
| 2008/0140747 | A1 | 6/2008 | Lee et al. | |
| 2013/0275729 | A1 | 10/2013 | Abraham et al. | |
| 2017/0052762 | A1 | 2/2017 | Gatherer | |
| 2018/0095758 | A1 * | 4/2018 | Dubtsov | G06F 9/30036 |

OTHER PUBLICATIONS

International Search Report and Written Opinion for International Patent Application No. PCT/US2017/040152, dated Mar. 9, 2018, 10 pages.

* cited by examiner

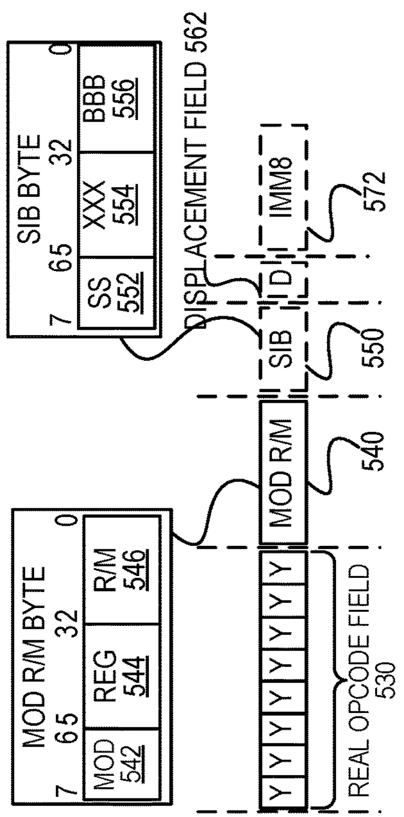
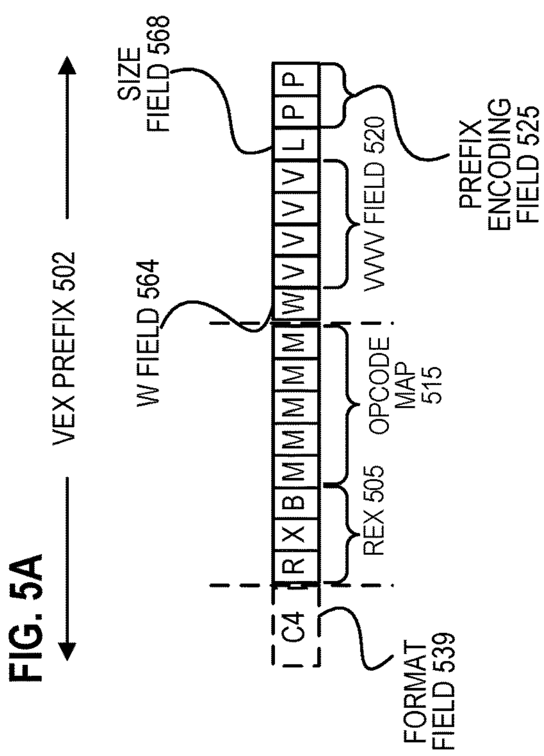
FIG. 5A
FIG. 5B
FULL OPCODE FIELD 574
FORMAT FIELD 540
C4
P P
M M M M M
W
Y Y Y Y Y Y Y Y
OPCODE MAP 515
DATA ELEMENT WIDTH FIELD 564
PREFIX ENCODING FIELD 525
BASE OPERATION FIELD 541
REAL OPCODE FIELD 530
FIG. 5C
REGISTER INDEX FIELD 544
R X B
REX 505
REG
544
R/M
546
V V V V
VVVV FIELD 520
XXX
554
BBB
556

SYSTEMS, APPARATUSES, AND METHODS FOR CONTROLLABLE SINE AND/OR COSINE OPERATIONS

CROSS-REFERENCE TO RELATED APPLICATIONS

This application is a national stage of International Application No. PCT/US2017/040152, filed Jun. 30, 2017, which is hereby incorporated by reference.

TECHNICAL FIELD

The field relates generally to computer processor architecture, and, more specifically, to instructions which when executed cause a particular result.

BACKGROUND

Significant developments in modern computing have arisen due to efforts to impart human abilities to computers. Many of these efforts have harnessed and extended relatively nascent techniques from the fields of machine learning, computer vision, speech recognition, and digital signal processing. However, these techniques are often extremely computationally expensive and require significant computing resources and time to implement them.

BRIEF DESCRIPTION OF THE DRAWINGS

Embodiments are illustrated by way of example and not limitation in the figures of the accompanying drawings, in which like references indicate similar elements and in which:

FIG. 5A illustrates an exemplary Advanced Vector Extensions (AVX) instruction format.

FIG. 5B illustrates which fields from FIG. 5A make up a full opcode field and a base operation field.

FIG. 5C illustrates which fields from FIG. 5A make up a register index field.

DETAILED DESCRIPTION

Figure 1:
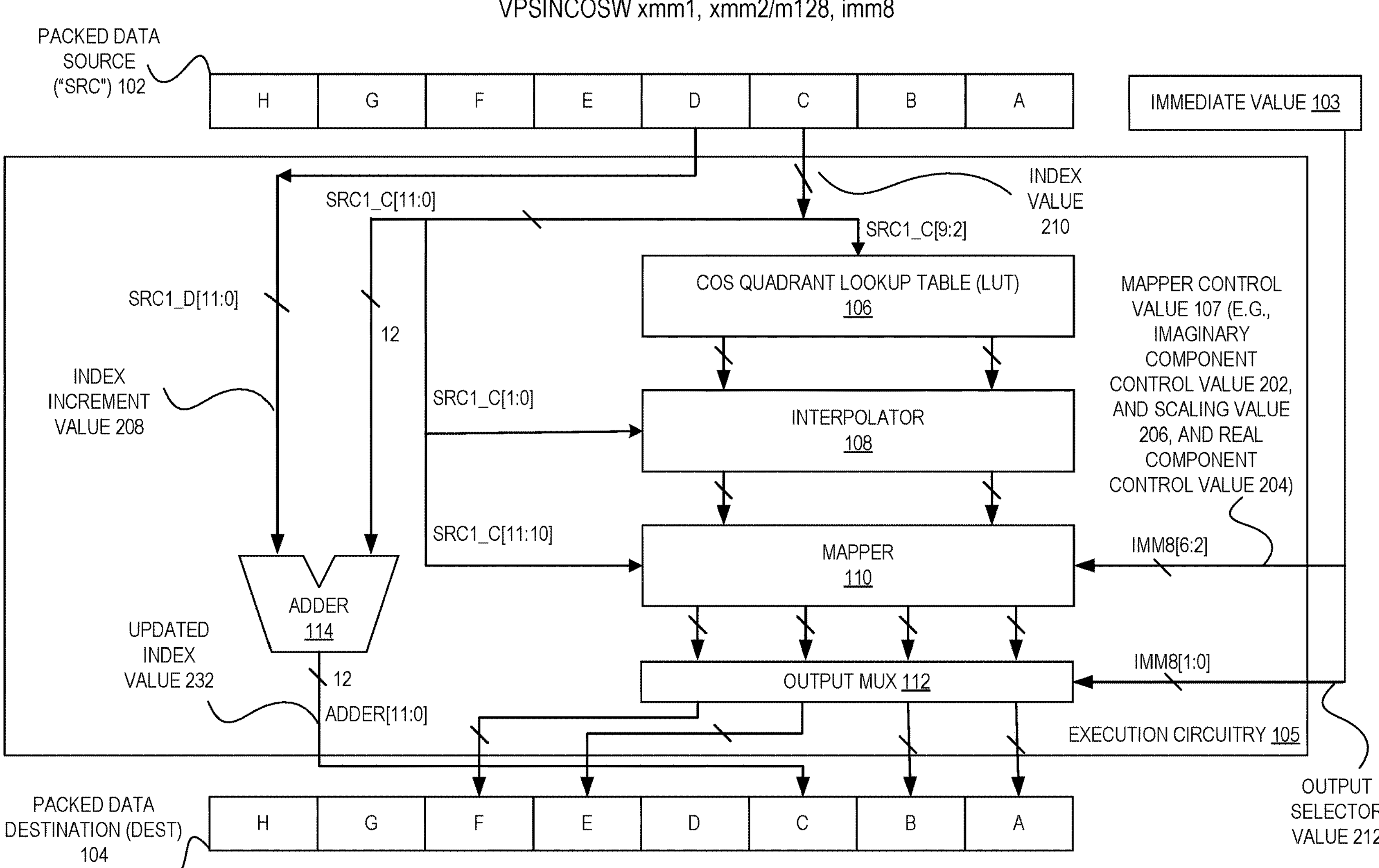
FIG. 1 illustrates an exemplary execution of a controllable sine and/or cosine word instruction according to some embodiments.

In the following description, numerous specific details are set forth. However, it is understood that embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

VPSINCOSW Instruction

Exemplary Execution

Detailed herein are embodiments of a VPSINCOSW instruction to improve a computer itself. In particular, the execution of the VPSINCOSW instruction causes a computer to perform controllable sine and/or cosine operations.

In some embodiments, the execution of a VPSINCOSW instruction causes an execution circuit (or execution unit) to perform operations for calculating cos( )+j*sin( ) and variations thereof. In some embodiments, an execution of a VPSINCOSW instruction causes an execution circuit (or execution unit) to perform sin( ) and/or cos( ) lookups. In some embodiments, the execution of a VPSINCOSW instruction does not generate any faults or exceptions.

In some embodiments, the operations include computing at least a real output value and an imaginary output value based on at least a cosine calculation and a sine calculation, wherein the cosine and sine calculations are each based on an index value from the packed data source operand; adding the index value with an index increment value from the packed data source operand to create an updated index value; and storing the real output value, the imaginary output value, and the updated index value to the packed data destination operand.

To perform these operations using existing conventional techniques, a large number of separate, correctly-ordered instructions would be required to be utilized. Embodiments disclosed herein utilizing the VPSINCOSW instruction can perform all of these operations, consistently in the correct order, using just one instruction. In some embodiments, a processor supporting the VPSINCOSW instruction can thus perform these operations significantly faster (and typically, with less power) than conventional processors due in part to the reduction in required instructions, reduce the complexity of application and/or compiler logic needed to generate instructions to perform these tasks, etc.

The VPSINCOSW instruction can be used for a wide variety of purposes, and can be particularly useful for a number of algorithms that include performing sine and/or cosine calculations. For example, in signal processing (and similar fields), signals that vary periodically over time can be represented as a combination of sinusoidal functions, which can be expressed as the sum of exponential functions with imaginary exponents using Euler's formula. For example, systems using the Fast Fourier Transform (FFT) algorithm may repeatedly include calculating cos( )+j*sin( ) or variations thereof.

FIG. 1 illustrates an exemplary execution of a VPSINCOSW instruction. The VPSINCOSW instruction format includes fields for a destination (packed data destination 104), a source (packed data source 102), and an immediate value 103. The destination and/or source, in various embodiments, can be registers (e.g., an XMM, YMM, ZMM, vector, SIMD, D, S, etc. register) or memory locations. For example, in some embodiments, the VPSINCOSW instruction utilizes a register as the destination, and either a register or a memory location for the second source. One example instruction of this configuration could be represented as "VPSINCOSW xmm1, xmm2/m128, imm8", where xmm1 is the destination, xmm2/m128 is the source, and imm8 is the immediate value.

The packed data source 102 and the packed data destination 104 are each shown as including eight packed data elements (shown as locations A-H), though in other embodiments there can be more or fewer data elements. For example, packed data source 102 can be 128 bits in size (or 256 bits, etc.) and pack data elements having a size of 16-bits (or 8-bits, 32-bits, etc.). In some embodiments, packed data source 102 is a packed data register, though in other embodiments packed data source 1 102 can be a memory location (e.g., of size 128 bits, 256 bits, etc.).

In some embodiments, some or all of the stored and/or operated upon data values may be "Q" values. For example, a signed Q15 number is typically a 16-bit value including one bit value to indicate the sign of the number (e.g., as in two's complement formats), and 15 bit values to represent the fractional aspect of the number. As is known to those of skill in the art, "Q" numbers are values represented in a fixed-point number format where the number of fractional bits (and optionally, the number of integer bits) is specified. For example, a "Q15" (or "Q0.15") number has 15 fractional bits, whereas a "Q1.15" number has 1 integer bit and 15 fractional bits.

As shown in FIG. 1, data from the packed data source 102 and one or more bit values of the immediate value 103 are fed into execution circuitry 105 to be operated on. In particular, execution circuitry 105 can perform operations for calculating cos( )+j*sin( ) and variations thereof. As used herein, a "word" generally is used to refer to 16 bits of data, although in different implementations a word can refer to more or fewer bits of data, such as 8 bits, 32 bits, 64 bits, etc. Similarly, a "quad word" (or quadword) is generally used to refer to an amount of data that is four times as large as a word. For example, when a word is 16 bits, a quadword may be 64 bits in size.

In this illustrated example, execution circuitry 105 includes an adder 114, a cosine (or "cos") quadrant lookup table (LUT) 106, an interpolator 108, a mapper 110, and an output multiplexer ("mux") 112. However, other configurations with more, fewer, and/or different types of circuitry can be utilized to achieve the same result.

In some embodiments, the cos quadrant LUT 106 may have one or more of the following properties: (1) the LUT may include 256+1 entries, (2) the LUT entries span the range of cos(0:pi/512:pi/2), (3) each LUT entry is an unsigned UQ0.15 value. The cos quadrant LUT 106 can be indexed by one or more input values shown here as SRC1_C [9:2] (or bits 2-9 of packed data element 'C' of packed data source 102)—serving as part of an index value.

This index value 210 can map to the range of [0, 2 pi) in increments of pi/2048 radians. Thus, in some embodiments the index value 210 can be used to determine the angle for the lookup.

As shown, bits 2-9 of the index value 210 can be used to perform the lookup in the LUT 106 which, when combined with the interpolator 108 and the mapper 110, can provide functionality for up to a 4096-point FFT.

Using the looked-up data from the LUT and one or more values (e.g., bits 0-1 of the index value 210, which are the least significant bits (LSB) of the index value 210), the interpolator 108 interpolates between successive entries of the LUT to determine "in-between" values.

The output data from the interpolator 108 can be provided to the mapper 110, which maps these values (produced from the stored LUT quadrant data of the LUT 106 and the resulting output of the interpolator 108) to the appropriate quadrant for the selected index, using one or more values (e.g., bits 10-11 of the index value 210, which are the most significant bits (MSB) of the index value 210) to assist in the determination of the proper quadrant.

The mapper 110 can also use, as an input, one or more control values from a mapper control value 107 (shown as "IMM8[6:2]", or bits 2-6 of the immediate value 103) to control what ultimate output values are generated by the execution circuitry 105. In some embodiments, these one or more control values include a scaling value 206 and/or a real component control value 204 and/or an imaginary component control value 202.

For example, in some embodiments the value of certain bits of the immediate value (e.g., bits 5-6) can represent the imaginary component control value 202, which can serve to control how the imaginary component resulting from the computation is to be generated. For example, in some embodiments imm8[6:5] specifies the requirements for the imaginary component, bit value 6 can indicate whether the imaginary component is to be negated. For example, in some embodiments Imm8[6]=0 indicates no negation of the imaginary component, whereas Imm8[6]=1 indicates negation of the imaginary component.

Likewise, in some embodiments, bit value 5 can indicate what function is to form the imaginary component. For example, a value of Imm8[5]=0 can indicate that the imaginary component uses the sine function, whereas a value of Imm8[5]=1 can indicate that the imaginary component is to use the cosine function.

Thus, in an embodiment using bits 5-6 of the immediate value 103 in this manner, a value of Imm8[6:5]=2'b11 can specify that the imaginary component is to be −cos( ).

Similarly, in some embodiments the value of certain bits of the immediate value (e.g., bits 3-4) can represent the real component control value 204, which can serve to control how the real component resulting from the computation is to be generated. For example, in some embodiments the value of bit 4 indicates whether the real component is to be negated (e.g., Imm8[4]=0 indicates no negation of the real component, whereas Imm8[4]=1 indicates negation of the real component). As another example, in some embodiments the value of bit 3 can indicate what function is to form the real component (e.g., a value of Imm8[3]=0 can indicate that the real component uses the sine function, whereas a value of Imm8[3]=1 can indicate that the imaginary component is to use the cosine function).

In some embodiments, one or more bit values from the immediate value 103 can serve as a scaling value 206. In some embodiments, bit value 2 can specify whether the output values are to be scaled—e.g., multiplying these values by one-half (½). For example, a value of Imm8[2]=0 can indicate that the real and imaginary components of the output are not scaled, whereas a value of Imm8[2]=1 can indicate that the real and imaginary components of the output are scaled by multiplying them by ½.

Thus, the mapper 110 can use the output of the interpolator 108, together with the one or more values (e.g., bits 10-11) of the index value 210 and the one or more control values (e.g., Imm8[6:2]) to generate the proper outputs—e.g., the real component value, the imaginary component output value, and optionally negated versions of the real component value and imaginary component output value. In some embodiments, these output values are signed Q1.15 values, and may be represented/stored as 16-bit two's complement numbers.

The output mux 112 can store the generated output values from the mapper 110 into the packed data destination 104 based on an output selector value 212, which may be made up of one or more bit values. For example, as shown in FIG. 1, in some embodiments the output mux 112 can use bits 0-1 of the immediate value 103 to determine which output values to store in the packed data destination 104 and/or which locations of the packed data destination 104 are to be used to store which output values.

For example, in some embodiments where Imm8[1:0] is used as the output selector value 212, when Imm8[1:0] =2'b00 or 2'b11, the pair of real and imaginary output values are written to DEST[31:0] (e.g., represented as packed data elements A-B of the packed data destination 104, where the real component can be written to bits 0-15 and the imaginary component can be written to bits 16-31—or the reverse), and further, a pair of negated real and imaginary values are written to DEST[95:64] (e.g., represented as packed data elements E-F of the packed data destination 104, where the negative real component can be written to bits 64-79 and the negative imaginary component can be written to bits 80-95—or the reverse). Thus, the pair of real and imaginary output values are stored to the low quadword of the packed data destination 104, while the pair of negated real and imaginary output values are stored to the high quadword of the packed data destination 104.

As another example, when Imm8[1:0]=2'b01, then the pair of real and imaginary output values are written to DEST[31:0] (or, the low quadword); however, DEST[95:64] is not over-written (i.e., the pair of negated real and imaginary output values are not saved in the packed data destination 104) and thus, DEST[95:64] may retain its previous value.

As another example, when Imm8[1:0]=2'b10, then the pair of real and imaginary output values are written to DEST[95:64] (or, the high quadword); however, DEST[31:0] is not over-written (i.e., the pair of negated real and imaginary output values are not saved in the packed data destination 104) and thus, DEST[31:0] may retain its previous value.

Additionally, the index value 210 (shown as SRC1_C[11:0]) can be incremented according to an index increment value 208 provided in the packed data source 102. For example, bits 48-59 can serve as a lookup index increment that can be added to the index value 210 (or "index accumulator") upon the execution of the instruction by the adder 114, and the result can be stored in the packed data destination 104, such as at bit values 32-43 (represented as packed data element 'C'). In some embodiments, this addition performed by the adder 114 is unsigned addition with wrapping (and thus, without saturation).

Thus, in some embodiments the execution by the execution circuitry 105 of the VPSINCOSW instruction can return a real and imaginary pair (plus other options) calculated from sin(theta) and cos(theta), where theta can be set by the index of the instruction as equal to the index*pi/2048.

Accordingly, this VPSINCOSW instruction and execution circuitry 105 can be used to compute twiddle factors for complex, real, and inverse FFTs with auto incrementing of the appropriate index, so that successive executions of the VPSINCOSW instruction (as commonly used in these FFT applications) return the next appropriate twiddle factor.

Additionally, in some embodiments, the VPSINCOSW instruction can also be used to perform a "simple" sine or cosine lookup using the same execution circuitry 105 and instruction format but with different control values from the packed data source 102 and/or immediate value 103.

Figure 2:
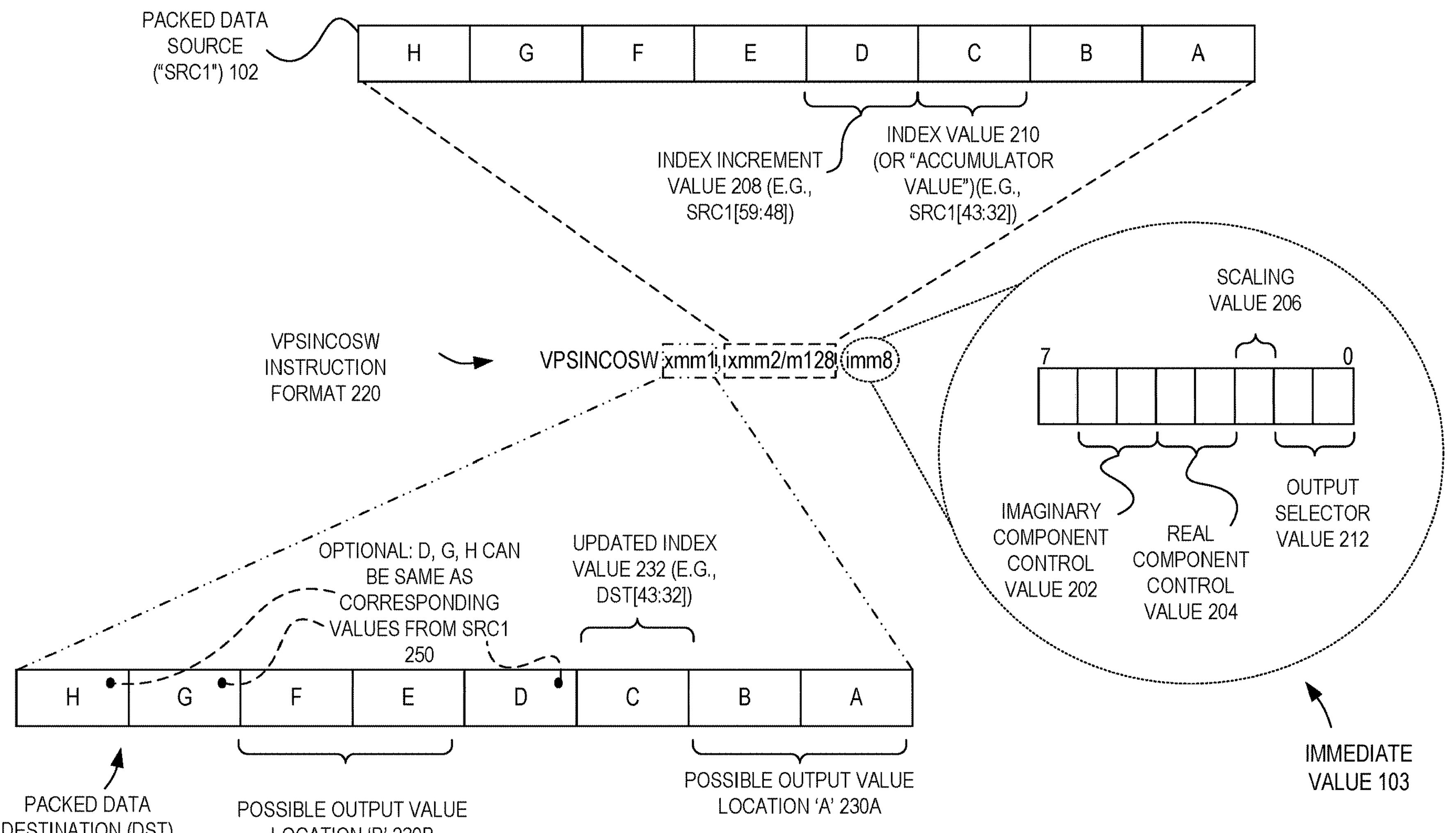
FIG. 2 illustrates an example configuration of control and output data locations according to some embodiments.

FIG. 2 illustrates an example configuration of control and output data locations according to some embodiments. In FIG. 2, the instruction format 220 of an exemplary VPSINCOSW instruction is shown as including a first "xmm1" operand (packed data destination 104, e.g., a packed data register), a second "xmm2/m128" operand (packed data source 102, e.g., a packed data register or memory location), and an immediate value 103 (e.g., 8 bits).

In this example, the packed data source 102 includes the index value 210 in bits 32-43 (in packed data element C), which serves as the index to be used for the lookup, and the index increment value 208 in bits 48-59 (in packed data element D), which identifies by what amount, if any, the index value has been incremented after the execution of the instruction.

Additionally, the immediate value 103 includes an output selector value 212 in bits 0-1 (which serves to control which output values are to be stored and/or which locations are to be used for storing output values), the scaling value 206 in bit 2 (which serves to control whether the output values are to be scaled by one-half), the real component control value 204 in bits 3-4 (which serves to control what function is to be used for the real component of the calculation and/or whether the function is to be negated), and the imaginary component control value 202 in bits 5-6 (which serves to control what function is to be used for the imaginary component of the calculation and/or whether the function is to be negated).

The packed data destination 104 illustrates several possible output value locations A-B 230A-230B that can be selected for output data storage based on the output selector value 212. For example, the real and imaginary output values can be stored into the "low" quadword at bits 0-15 and 16-31, respectively. As another example, the real and imaginary output values can be stored into the "high" quadword at bits 64-79 and 80-95, respectively. As another example, the real and imaginary output values can be stored into the "low" quadword at bits 0-15 and 16-31, respectively, and a pair of negated real and imaginary output values can be stored into the "high" quadword at bits 64-79 and 80-95, respectively.

The packed data destination 104 also includes a location for storage of the updated index value 232 formed as a result of the adder 114 adding the index value 210 with the index increment value 208. The updated index value 232 can be stored, for example, as bits 32-43 of the packed data destination 104 (in packed data element C).

In some embodiments, the values of packed data elements A, B, D, E F G, and/or H can be "preserved" from the packed data source 102. For example, in some embodiments these values can be written to the corresponding locations of packed data destination 104. In some embodiments, this can beneficially allow for a single register to be used as the packed data source 102 and the packed data destination 104 for one or multiple executions of the VPSINCOSW instruction—in such embodiments, these packed data operands will not be modified.

As indicated above, the size of the involved data can be different than what is described here. For example, in some embodiments the size of the packed data (e.g., packed data source 102 and/or the packed data destination 104) can be 256 bits, 512 bits, 1024 bits, etc. In some such embodiments, the set of sin and/or cosine operations described herein may be performed multiple times responsive to a single instruction. For example, in an embodiment where the size of the packed data is 256 bits, the controllable set of operations can be performed (as described above) using bits 0-127, and the controllable set of operations—which can be the same or different (e.g., based on different source/control data, such as a different index increment value 208 (e.g., =SRC1[59:48]+2, stored at SRC1[187:176])—can also be performed for bits 128-255, and produce different results (e.g., also to be stored in a new corresponding set of bits of the packed data destination 104). The same can be true in other embodiments for larger sizes, e.g., when the size of the packed data is 512 bits (e.g., the operations can be performed for four potentially-different sets of input/source values), 1024 bits, and so on.

In some embodiments with such larger sizes of packed data, some or all of the execution circuitry 105 may be replicated to allow for each set of the operations to be performed by a (at least partially) dedicated set of circuitry. In some embodiments, some of the execution circuitry 105 can be shared—e.g., via additional ports added to the LUT 106, etc.—so that the execution of each set of operations can utilize (at least partially) shared circuitry.

Exemplary Source/Immediate Encodings for Exemplary Applications

The following tables provide several example encodings for some different sine and/or cosine calculations that may be useful in a variety of applications. However, it is to be understood that these examples provide only a few such configurations, and thus there are many other configurations that can be used for a wide variety of applications.

Table 1 shows example parameter values that can be used for utilizing an auto-incrementing twiddle factor for performing 4096-point FFT. These values case the imaginary component to be −sin( ) the real component to be cos( ) no scaling to be performed, an increment of 4096, and the pair of real and imaginary output values to be written to either the high or low quad word of the packed data destination 104.

TABLE 1

Auto-incrementing twiddle factor for 4096 point FFT

| Parameter | SRC1, Imm8 Bits | Value | Meaning | Description |
|---|---|---|---|---|
| Imaginary Component Control Value (202) | Imm8[6:5] | 2'b10 | −sin( ) | imaginary part of expj(−theta) |
| Real Component Control Value (204) | Imm8[4:3] | 2'b01 | cos( ) | real part of expj(−theta) |
| Scaling Value (206) | Imm8[2] | 1'b0 | Scale = 1 | cos(theta) − j * sin(theta) |
| Index Increment Value (208) | SRC1[59:48] | 12'd1 | N = 4096 | 4096/1 |
| Index Value (210) | SRC1[43:32] | 12'd0 | | No initial offset |
| Output Selector Value (212) | Imm8[1:0] | 2'b01 or 2'b10 | | Write 32 bits to either low (2'b01) or high (2'b10) Quad word |

Table 2 shows example parameter values that can be used for utilizing an auto-incrementing twiddle factor for performing 256-point FFT. Similar to Table 1, these values case the imaginary component to be −sin( ), the real component to be cos( ), no scaling to be performed, and the pair of real and imaginary output values to be written to either the high or low quad word of the packed data destination 104. However, in this case the increment is of 256 to assist in the 256-point FFT operations.

TABLE 2

Auto-incrementing twiddle factor for 256 point FFT

| Parameter | SRC1 Bits | Value | Meaning | Description |
|---|---|---|---|---|
| Imaginary Component Control Value (202) | Imm8[6:5] | 2'b10 | −sin( ) | imaginary part of expj(−theta) |

TABLE 2-continued

| Auto-incrementing twiddle factor for 256 point FFT | | | | |
|---|---|---|---|---|
| Parameter | SRC1 Bits | Value | Meaning | Description |
| Real Component Control Value (204) | Imm8[4:3] | 2'b01 | cos( ) | real part of expj(−theta) |
| Scaling Value (206) | Imm8[2] | 1'b0 | Scale = 1 | cos(theta) − j * sin(theta) |
| Index Increment Value (208) | SRC1[59:48] | 12'd16 | N = 256 | 4096/16 |
| Index Value (210) | SRC1[43:32] | 12'd0 | | No initial offset |
| Output Selector Value (212) | Imm8[1:0] | 2'b01 or 2'b10 | | Write 32 bits to either low (2'b01) or high (2'b10) Quad word |

Table 3 shows example parameter values that can be used for utilizing an auto-incrementing complex coefficient for N-point real FFT extraction from N/2-point complex FFT. These values case the imaginary component to be −cos( ), the real component to be −sin( ), scaling to be performed (e.g., of ½), an increment of 512, and the pair of real and imaginary output values to be written to the low quad word of the packed data destination 104 and the pair of negated real and imaginary output values to be written to the high quad word of the packed data destination 104.

TABLE 3

| Auto-incrementing complex coefficient for N-point real FFT extraction from N/2-point complex FFT | | | | |
|---|---|---|---|---|
| Parameter | SRC1 Bits | Value | Meaning | Description |
| Imaginary Component Control Value (202) | Imm8[6:5] | 2'b11 | −cos( ) | Imaginary part |
| Real Component Control Value (204) | Imm8[4:3] | 2'b10 | −sin( ) | Real part |
| Scaling Value (206) | Imm8[2] | 1'b1 | Scale = ½ | −sin(theta)/2 − j * cos(theta)/2 |
| Index Increment Value (208) | SRC1[59:48] | 12'd8 | N = 512 | 4096/8 |
| Index Value (210) | SRC1[43:32] | 12'd0 | | No initial offset |
| Output Selector Value (212) | Imm8[1:0] | 2'b00 | | Write pair of real and imaginary values to 32 bits of low Quad word. Write pair of negated real and imaginary values to 32 bits of high Quad word. |

Table 4 shows example parameter values that can be used for utilizing sine and cosine lookups. These values case the imaginary component to be sin( ), the real component to be cos( ), no scaling, no increment, and an initial index set so that theta is equal to 124*pi/2046 radians (which can be changed to other values to perform other lookups). The pair of real and imaginary output values can be written to either the high or low quad word of the packed data destination 104.

TABLE 4

| cos, sin lookup without auto-incrementing | | | | |
|---|---|---|---|---|
| Parameter | SRC1 Bits | Value | Meaning | Description |
| Imaginary Component Control Value (202) | Imm8[6:5] | 2'b00 | sin( ) | imaginary part of expj(theta) |
| Real Component Control Value (204) | Imm8[4:3] | 2'b01 | cos( ) | real part of expj(theta) |

TABLE 4-continued

| cos, sin lookup without auto-incrementing | | | | |
|---|---|---|---|---|
| Parameter | SRC1 Bits | Value | Meaning | Description |
| Scaling Value (206) | Imm8[2] | 1'b0 | Scale = 1 | cos(theta) + j * sin(theta) |
| Index Increment Value (208) | SRC1[59:48] | 12'd0 | | No increment - set to zero |
| Index Value (210) | SRC1[43:32] | 12'd124 | | Theta = 124 * pi/2046 radians |
| Output Selector Value (212) | Imm8[1:0] | 2'b01 or 2'b10 | | Write 32 bits to either low (2'b01) or high (2'b10) Quad word |

Table 5 shows example parameter values that can be used for utilizing cosine and cosine lookups. These values case the imaginary component to be −cos( ), the real component to be cos( ), no scaling, no increment, and an initial index set so that theta is equal to 132*pi/2046 radians (which can be changed to other values to perform other lookups). The pair of real and imaginary output values can be written to either the high or low quad word of the packed data destination 104.

TABLE 5

| cos, cos lookup without auto-incrementing | | | | |
|---|---|---|---|---|
| Parameter | SRC1 Bits | Value | Meaning | Description |
| Imaginary Component Control Value (202) | Imm8[6:5] | 2'b11 | −cos( ) | imaginary part |
| Real Component Control Value (204) | Imm8[4:3] | 2'b01 | cos( ) | real part |
| Scaling Value (206) | Imm8[2] | 1'b0 | Scale = 1 | cos(theta) − j * cos(theta) |
| Index Increment Value (208) | SRC1[59:48] | 12'd0 | | No increment - set to zero |
| Index Value (210) | SRC1[43:32] | 12'd132 | | Theta = 132 × pi/2046 radians |
| Output Selector Value (212) | Imm8[1:0] | 2'b01 or 2'b10 | | Write 32 bits to either lower (2'b01) or upper (2'b10) quad word |

Exemplary Pseudocode Corresponding to the VPSINCOSW Instruction

The following pseudocode in Table 6 illustrates the conceptual set of operations performed resultant to the VPSINCOSW instruction and is provided for the sake of understanding. Thus, it is to be understood that these particular operations do not necessarily need to be implemented as other techniques exist that are known or derivable by those of skill in the art, and that these operations need not be implemented in this particular order, and so on.

TABLE 6

```
(* N1 = 8    : LUT bits *)
(* N2 = 2    : Interpolation bits; Q0.3 *)
(* N3 = 2 + N1 + N2 *)
PHASE_ACC[(N3−1):0]      ← SRC1[(N3+31):32];
PHASE_INC[(N3−1):0]      ← SRC1[(N3+47):48];
IMAG_SPEC[1:0]           ← Imm8[6:5];
REAL_SPEC[1:0]           ← Imm8[4:3];
DIV_SPEC[0]              ← Imm8[2];
(* UnSigned addition with wrapping *)
ADDER_OUT[(N3−1):0]      ← PHASE_ACC[(N3−1):0] + PHASE_INC[(N3−1):0];
QUADRANT[1:0]            ← PHASE_ACC[(N3−1):(N3−2)];
LUT_INDEX[(N1−1):0]      ← PHASE_ACC[(N3−3):N2];
FRACTION[(N2−1):0]       ← PHASE_ACC[(N2−1):0]; (* Interpolation bits *)
INDEX_C1[N1:0] ← {1'b0, LUT_INDEX[(N1−1):0]}; (* Cosine Look Up Index *)
INDEX_C2[N1:0] ← LUT_INDEX[(N1−1):0] + 1'b1; (* UnSigned addition *)
INDEX_S2[N1:0] ← {1'b0, ~LUT_INDEX[(N1−1):0]};    (* Sine Look Up Index *)
INDEX_S1[N1:0] ← ~LUT_INDEX[(N1−1):0] + 1'b1;    (* Unsigned addition *)
```

TABLE 6-continued

```
SCALE1[N2:0] ← ~FRACTION[N2−1:0] + 1'b1;            (* Unsigned value *)
SCALE2[N2:0] ← {1'b0, FRACTION[N2−1:0]};            (* Unsigned value *)
(* LUT has 2^N1 + 1 entries *)
(* Each LUT entry includes correction bits concatenated with one value of
COS(0:(pi/2)/2^N1:pi/2) *)
(* The COS component of the LUT entries are unsigned 15-bit numbers in Q0.15
*)
LUT_C1[(13+2^(N2+1)):0] = LUT[INDEX_C1[N1:0]];
LUT_C2[(13+2^(N2+1)):0] = LUT[INDEX_C2[N1:0]];
LUT_S1[(13+2^(N2+1)):0] = LUT[INDEX_S1[N1:0]];
LUT_S2[(13+2^(N2+1)):0] = LUT[INDEX_S2[N1:0]];
IF(DIV_SPEC[0] == 1'b0)
        CORRECTION_BITS_VAL1 = {LUT_C1[(13+2^(N2+1)):(15+2^N2)], 1'b0};
        CORRECTION_BITS_VAL2 = {LUT_S2[(15+2^N2):[(13+2^(N2+1))], 1'b0}; //
order reversal
ELSE
        CORRECTION_BITS_VAL1 = LUT_C1[(14+2^N2):15];
        CORRECTION_BITS_VAL2 = {LUT_S2[16:(14+2^N2)], LUT_S1[15]}; // order
reversal
CORRECTION_BIT1 = CORRECTION_BITS_VAL1[FRACTION[N2−1:0]];
CORRECTION_BIT2 = CORRECTION_BITS_VAL2[FRACTION[N2−1:0]];
(* No need for growth by 1 bit due to addition - by design of LUT entries
and SCALE values*)
(* VAL1, VAL2 are positive Signed Values*)
VAL1[(N2+15):0] ← SCALE1[N2:0]*LUT_C1[14:0] + SCALE2[N2:0]*LUT_C2[14:0];
VAL2[(N2+15):0] ← SCALE1[N2:0]*LUT_S1[14:0] + SCALE2[N2:0]*LUT_S2[14:0];
(* VAL1 and VAL2 guaranteed to be positive, COS_VAL and SIN_VAL are Signed
Q15 *)
(* By design correction bit will not cause wrap around *)
IF (DIV_SPEC[0] == 1'b0)
        COS_VAL[15:0] ← VAL1[(N2+15):N2]) + CORRECTION_BIT1;
        SIN_VAL[15:0] ← VAL2[(N2+15):N2]) + CORRECTION_BIT2;
ELSE
        COS_VAL[15:0] ← {1'b0, VAL1[(N2+15):(N2+1)])} + CORRECTION_BIT1;
        SIN_VAL[15:0] ← {1'b0, VAL2[(N2+15):(N2+1)]) } + CORRECTION_BIT2;
(* MCOS_VAL and MSIN_VAL are Signed Q15 *)
MCOS_VAL[15:0] ← ~COS_VAL[15:0] + 1'b1; (* Effectively 2's complement
negation *)
MSIN_VAL[15:0] ← ~SIN_VAL[15:0] + 1'b1; (* Effectively 2's complement
negation *)
REAL_SELECT[1:0] ← REAL_SPEC[1:0] + QUADRANT[1:0]; (* UnSigned addition with
wrapping *)
IMAG_SELECT[1:0] ← IMAG_SPEC[1:0] + QUADRANT[1:0]; (* UnSigned addition with
wrapping *)
IF (REAL_SELECT[1:0] == 2'b00)
        REAL_VAL0[15:0] ← SIN_VAL[15:0];
        REAL_VAL1[15:0] ← MSIN_VAL[15:0];
ELSE IF (REAL_SELECT == 2'b01)
        REAL_VAL0[15:0] ← COS_VAL[15:0];
        REAL_VAL1[15:0] ← MCOS_VAL[15:0];
ELSE IF (REAL_SELECT == 2'b10)
        REAL_VAL0[15:0] ← MSIN_VAL[15:0];
        REAL_VAL1[15:0] ← SIN_VAL[15:0];
ELSE
        REAL_VAL0[15:0] ← MCOS_VAL[15:0];
        REAL_VAL1[15:0] ← COS_VAL[15:0];
IF (IMAG_SELECT[1:0] == 2'b00)
        IMAG_VAL0[15:0] ← SIN_VAL[15:0];
        IMAG_VAL1[15:0] ← MSIN_VAL[15:0];
ELSE IF (REAL_SELECT == 2'b01)
        IMAG_VAL0[15:0] ← COS_VAL[15:0];
        IMAG_VAL1[15:0] ← MCOS_VAL[15:0];
ELSE IF (REAL_SELECT == 2'b10)
        IMAG_VAL0[15:0] ← MSIN_VAL[15:0];
        IMAG_VAL1[15:0] ← SIN_VAL[15:0];
ELSE
        IMAG_VAL0[15:0] ← MCOS_VAL[15:0];
        IMAG_VAL1[15:0] ← COS_VAL[15:0];
IF (imm8[1:0] == 2'b01)
        DEST[15:0]  ← REAL_VAL0[15:0];
        DEST[31:16] ← IMAG_VAL0[15:0];
        DEST[95:64] ← DEST[95:64];
ELSE IF (imm8[1:0] == 2'b10)
        DEST[31:0]  ← DEST[31:0] ;
        DEST[79:64] ← REAL_VAL0[15:0];
        DEST[95:80] ← IMAG_VAL0[15:0];
ELSE IF (imm8[1:0] == 2'b00)
        DEST[15:0]  ← REAL_VAL0[15:0];
        DEST[31:16] ← IMAG_VAL0[15:0];
```

TABLE 6-continued

```
        DEST[79:64] ← REAL_VAL1[15:0];
        DEST[95:80] ← IMAG_VAL1[15:0];
ELSE
        DEST[15:0]  ← REAL_VAL0[15:0];
        DEST[31:16] ← IMAG_VAL0[15:0];
        DEST[79:64] ← REAL_VAL0[15:0];
        DEST[95:80] ← IMAG_VAL1[15:0];
(* Update the Accumulator and Retain the increment, and Upper bits of the
Destination *)
DEST[(N3+31):32]    ← ADDER_OUT[(N3-1):0];
DEST[63:(N3+32)]    ← SRC1[63:(N3+32)];
DEST[127:96]        ← SRC1[127:96];
```

Exemplary Hardware to Execute the VPSINCOSW Instruction

Figure 3:
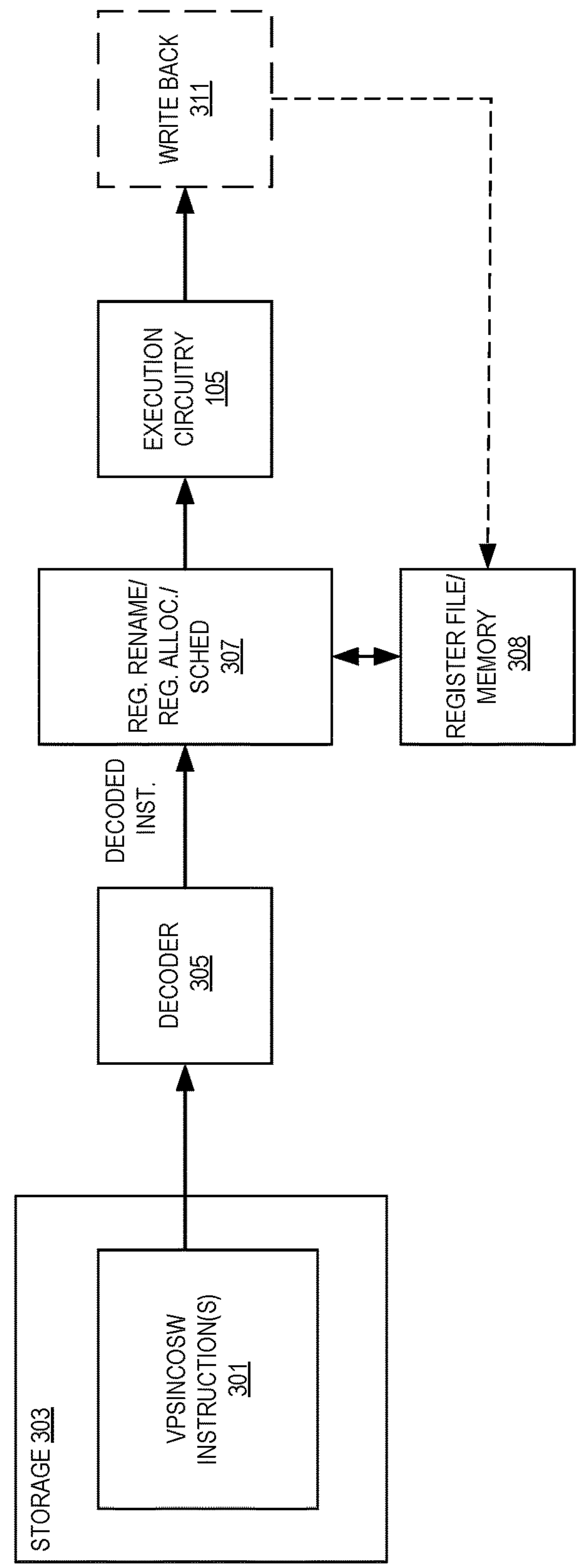
FIG. 3 illustrates hardware of an embodiment to process an instruction such as a sine and/or cosine word instruction according to some embodiments.

FIG. 3 illustrates an embodiment of hardware to process an instruction such as a controllable sine and/or cosine word (VPSINCOSW) instruction. As illustrated, storage 303 stores a VPSINCOSW instruction 301 to be executed.

The instruction is received by decode circuitry 305. For example, the decode circuitry 305 receives this instruction from fetch logic/circuitry. The instruction 301 includes fields for an opcode, a destination, a source, and an immediate value. In some embodiments, the source and destination are registers, and in other embodiments at least one is a memory locations. More detailed embodiments of at least one instruction format will be detailed later. The decode circuitry 305 decodes the instruction into one or more operations. In some embodiments, this decoding includes generating a plurality of micro-operations to be performed by execution circuitry (such as execution circuitry). The decode circuitry 305 also decodes instruction prefixes (if used).

In some embodiments, register renaming, register allocation, and/or scheduling circuitry 307 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 308 store data as operands of the instruction to be operated on by execution circuitry. Exemplary register types include packed data registers, general purpose registers, and floating-point registers.

Execution circuitry executes 105 the decoded VPSINCOSW instruction. Exemplary detailed execution circuitry 105 was shown in FIG. 1. The execution of the decoded VPSINCOSW instruction causes the execution circuitry 105 to perform operations for controllable sine and/or cosine word operations as described herein.

Write back (retirement) circuitry 311 commits the result of the execution of the decoded VPSINCOSW instruction. In some embodiments, retirement/write back circuitry architecturally commits the destination register into the registers or memory and retires the instruction.

Exemplary Formats of the VPSINCOSW Instruction

An embodiment of a format for a VPSINCOSW instruction is VPSINCOSW DEST, SRC, IMM. In some embodiments, VPSINCOSW is the opcode mnemonic of the instruction. In some embodiments, DEST is a field for the packed data destination register operand, and SRC is a field for the source such as a packed data register and/or memory location. For example, in some embodiments, the DEST is an xmm register, and the SRC is either an xmm register or a memory location. In some embodiments, the instruction can utilize a VEX encoding. The immediate value may be an IMM8 QAA72 (shown later herein), and/or the source can be represented in Mod R/M byte 540 (e.g., as register index field 544, as R/M value 546).

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Exemplary Method of Execution of the VPSINCOSW Instruction

Figure 4:
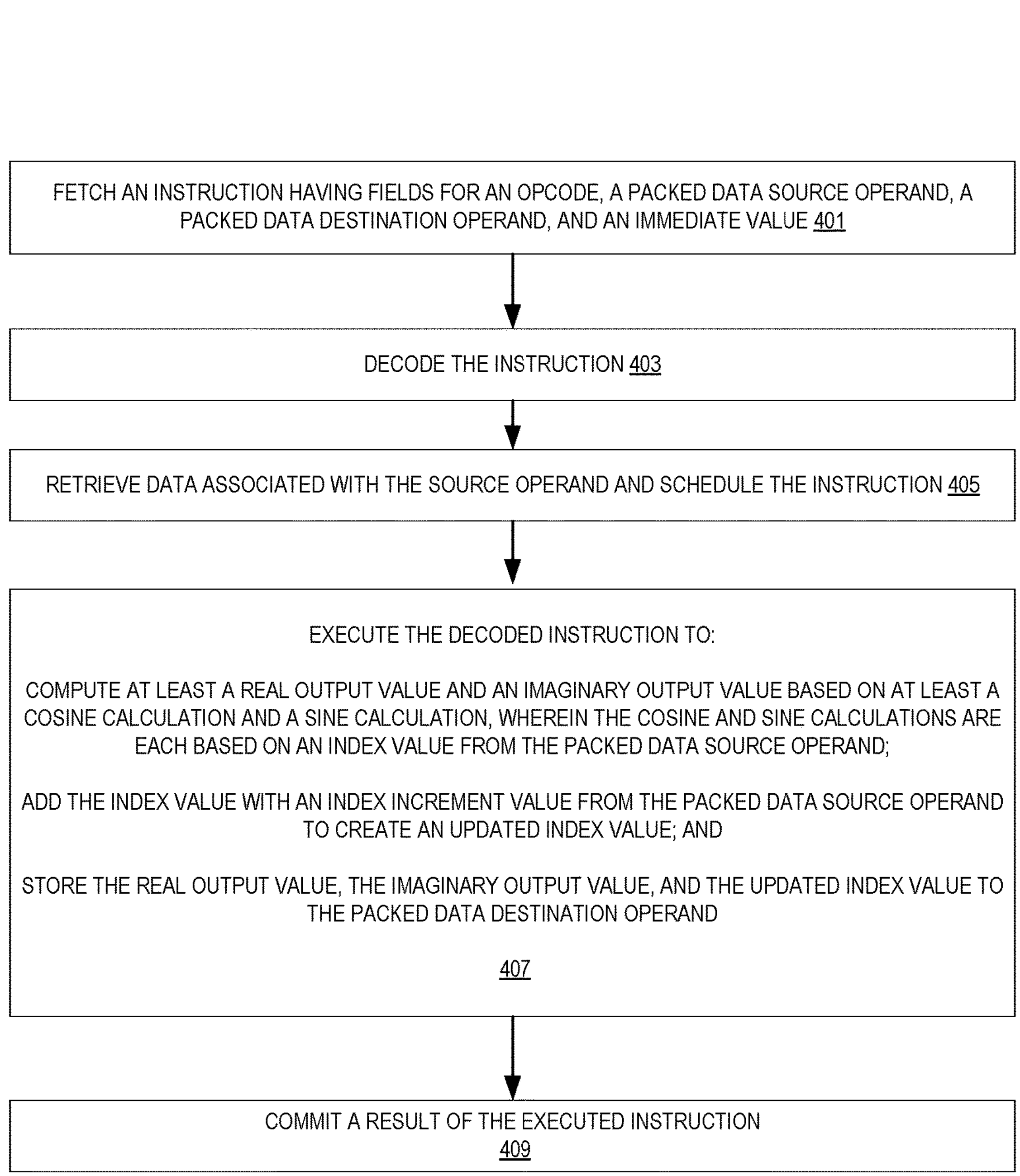
FIG. 4 illustrates an embodiment of a method performed by a processor to process a sine and/or cosine word instruction according to some embodiments.

FIG. 4 illustrates an embodiment of method performed by a processor to process a VPSINCOSW instruction. For example, the processor components of FIG. 3, a pipeline as detailed below, etc., performs this method.

At 401, an instruction is fetched. For example, a VPSINCOSW instruction is fetched. The VPSINCOSW instruction includes fields for an opcode, a first and a second source operand, and a destination operand. In some embodiments, the instruction is fetched from an instruction cache. The source and destination operands are packed data.

The fetched instruction is decoded at 403. For example, the fetched VPSINCOSW instruction is decoded by decode circuitry such as that detailed herein.

Data values associated with the source operands of the decoded instruction are retrieved at 405 and the decoded instruction is scheduled (as needed). For example, when one or more of the source operands are memory operands, the data from the indicated memory location is retrieved.

At 407, the decoded instruction is executed by execution circuitry (hardware) such as that detailed herein. For the VPSINCOSW instruction, the execution will cause execution circuitry to perform controllable sine and/or cosine operations. In some embodiments, execution will cause execution circuitry to compute at least a real output value and an imaginary output value based on at least a cosine calculation and a sine calculation, wherein the cosine and sine calculations are each based on an index value from the packed data source operand; add the index value with an index increment value from the packed data source operand to create an updated index value; and store the real output value, the imaginary output value, and the updated index value to the packed data destination operand.

In some embodiments, the instruction is committed or retired at 409.

EXAMPLES

Exemplary embodiments are detailed below.

1. An apparatus comprising: a decoder to decode an instruction having fields for a packed data source operand, a packed data destination operand, and an immediate value, and execution circuitry to execute the decoded instruction to: compute at least a real output value and an imaginary output value based on at least a cosine calculation and a sine calculation, wherein the cosine and sine calculations are each based on an index value from the packed data source operand; add the index value with an index increment value from the packed data source operand to create an updated index value; and store the real output value, the imaginary output value, and the updated index value to the packed data destination operand.

2. The apparatus of example 1, wherein: the cosine calculation includes generating a cosine of a theta value, the theta value being based on the index value and a value of pi; the sine calculation includes generating a sine of the theta value; and the computation is based on the cosine calculation result, the sine calculation result, and an imaginary number, wherein the imaginary number is the square root of negative one.

3. The apparatus of any one of examples 1-2, wherein: the cosine and sine calculations are further based on an imaginary component control value from the immediate value and a real component control value from the immediate value; the imaginary component control value indicates whether an imaginary component of the computation is to be negated and whether the imaginary component of the computation is to include the cosine calculation or the sine calculation; and the real component control value indicates whether a real component of the computation is to be negated and whether the real component of the computation is to include the cosine calculation or the sine calculation.

4. The apparatus of any one of examples 1-3, wherein the execution circuitry, to compute at least the real output value and the imaginary output value, is further to: scale an intermediate real output value and an intermediate imaginary output value by a value of one-half (½) responsive to a scaling value of the immediate value having a first value to create the real output value and the imaginary output value.

5. The apparatus of any one of examples 1-4, wherein the execution circuitry is further to store the real output value and the imaginary output value at a location within the packed data destination operand based on an output selector value of the immediate value.

6. The apparatus of example 5, wherein: when the output selector value is a first value, the real output value and the imaginary output value are stored in a low quadword of the packed data destination operand; and when the output selector value is a second value, the real output value and the imaginary output value are stored in a high quadword of the packed data destination operand.

7. The apparatus of example 5, wherein the execution circuitry is further to: compute a negative real output value and a negative imaginary output value; and store the negative real output value and the negative imaginary output value within the packed data destination operand.

8. The apparatus of any one of examples 1-7, wherein the real output value and the imaginary output value are each signed Q1.15 values.

9. A method comprising: decoding an instruction having fields for a packed data source operand, a packed data destination operand, and an immediate value, and executing the decoded instruction to: compute at least a real output value and an imaginary output value based on at least a cosine calculation and a sine calculation, wherein the cosine and sine calculations are each based on an index value from the packed data source operand; add the index value with an index increment value from the packed data source operand to create an updated index value; and store the real output value, the imaginary output value, and the updated index value to the packed data destination operand.

10. The method of example 9, wherein: the cosine calculation includes generating a cosine of a theta value, the theta value being based on the index value and a value of pi; the sine calculation includes generating a sine of the theta value; and the computation is based on the cosine calculation result, the sine calculation result, and an imaginary number, wherein the imaginary number is the square root of negative one.

11. The method of any one of examples 9-10, wherein: the cosine and sine calculations are further based on an imaginary component control value from the immediate value and a real component control value from the immediate value; the imaginary component control value indicates whether an imaginary component of the computation is to be negated and whether the imaginary component of the computation is to include the cosine calculation or the sine calculation; and the real component control value indicates whether a real component of the computation is to be negated and whether the real component of the computation is to include the cosine calculation or the sine calculation.

12. The method of any one of examples 9-11, wherein the computation of at least the real output value and the imaginary output value includes: scaling an intermediate real output value and an intermediate imaginary output value by a value of 2 responsive to a scaling value of the immediate value having a first value to create the real output value and the imaginary output value.

13. The method of any one of examples 9-12, wherein the execution further comprises storing the real output value and the imaginary output value at a location within the packed data destination operand based on an output selector value of the immediate value.

14. The method of example 13, wherein: when the output selector value is a first value, the real output value and the imaginary output value are stored in a low quadword of the packed data destination operand; and when the output selector value is a second value, the real output value and the imaginary output value are stored in a high quadword of the packed data destination operand.

15. The method of example 13, wherein the execution further comprises: computing a negative real output value and a negative imaginary output value; and storing the negative real output value and the negative imaginary output value within the packed data destination operand.

16. The method of example any one of examples 9-15, wherein the real output value and the imaginary output value are each signed Q1.15 values.

17. A non-transitory machine-readable medium storing an instruction which, when executed by a processor, causes the processor to perform a method, the method comprising: decoding an instruction having fields for a packed data source operand, a packed data destination operand, and an immediate value, and executing the decoded instruction to: compute at least a real output value and an imaginary output value based on at least a cosine calculation and a sine calculation, wherein the cosine and sine calculations are each based on an index value from the packed data source operand; add the index value with an index increment value from the packed data source operand to create an updated index value; and store the real output value, the imaginary output value, and the updated index value to the packed data destination operand.

18. The non-transitory machine-readable medium of example 17, wherein: the cosine calculation includes generating a cosine of a theta value, the theta value being based on the index value and a value of pi; the sine calculation includes generating a sine of the theta value; and the computation is based on the cosine calculation result, the sine calculation result, and an imaginary number, wherein the imaginary number is the square root of negative one.

19. The non-transitory machine-readable medium of any one of examples 17-18, wherein: the cosine and sine calculations are further based on an imaginary component control value from the immediate value and a real component control value from the immediate value; the imaginary component control value indicates whether an imaginary component of the computation is to be negated and whether the imaginary component of the computation is to include the cosine calculation or the sine calculation; and the real component control value indicates whether a real component of the computation is to be negated and whether the real component of the computation is to include the cosine calculation or the sine calculation.

20. The non-transitory machine-readable medium of any one of examples 17-19, wherein the computation of at least the real output value and the imaginary output value includes: scaling an intermediate real output value and an intermediate imaginary output value by a value of 2 responsive to a scaling value of the immediate value having a first value to create the real output value and the imaginary output value.

21. The non-transitory machine-readable medium of any one of examples 17-20, wherein the execution further comprises storing the real output value and the imaginary output value at a location within the packed data destination operand based on an output selector value of the immediate value.

22. The non-transitory machine-readable medium of example 21, wherein: when the output selector value is a first value, the real output value and the imaginary output value are stored in a low quadword of the packed data destination operand; and when the output selector value is a second value, the real output value and the imaginary output value are stored in a high quadword of the packed data destination operand.

23. The non-transitory machine-readable medium of example 21, wherein the execution further comprises: computing a negative real output value and a negative imaginary output value; and storing the negative real output value and the negative imaginary output value within the packed data destination operand.

24. The non-transitory machine-readable medium of any one of examples 17-23, wherein the real output value and the imaginary output value are each signed Q1.15 values.

25. An apparatus comprising:

a decoder means to decode an instruction having fields for a packed data source operand, a packed data destination operand, and an immediate value, and an execution means to execute the decoded instruction to: compute at least a real output value and an imaginary output value based on at least a cosine calculation and a sine calculation, wherein the cosine and sine calculations are each based on an index value from the packed data source operand; add the index value with an index increment value from the packed data source operand to create an updated index value; and store the real output value, the imaginary output value, and the updated index value to the packed data destination operand.

26. The apparatus of example 25, wherein: the cosine calculation includes generating a cosine of a theta value, the theta value being based on the index value and a value of pi; the sine calculation includes generating a sine of the theta value; and the computation is based on the cosine calculation result, the sine calculation result, and an imaginary number, wherein the imaginary number is the square root of negative one.

27. The apparatus of any one of examples 25-26, wherein: the cosine and sine calculations are further based on an imaginary component control value from the immediate value and a real component control value from the immediate value; the imaginary component control value indicates whether an imaginary component of the computation is to be negated and whether the imaginary component of the computation is to include the cosine calculation or the sine calculation; and the real component control value indicates whether a real component of the computation is to be negated and whether the real component of the computation is to include the cosine calculation or the sine calculation.

28. The apparatus any one of examples 25-27, wherein the execution means, to compute at least the real output value and the imaginary output value, is further to: scale an intermediate real output value and an intermediate imaginary output value by a value of one-half (½) responsive to a scaling value of the immediate value having a first value to create the real output value and the imaginary output value.

29. The apparatus of any one of examples 25-28, wherein the execution means is further to store the real output value and the imaginary output value at a location within the packed data destination operand based on an output selector value of the immediate value.

30. The apparatus of example 29, wherein: when the output selector value is a first value, the real output value and the imaginary output value are stored in a low quadword of the packed data destination operand; and when the output selector value is a second value, the real output value and the imaginary output value are stored in a high quadword of the packed data destination operand.

31. The apparatus of example 29, wherein the execution means is further to: compute a negative real output value and a negative imaginary output value; and store the negative real output value and the negative imaginary output value within the packed data destination operand.

32. The apparatus any one of examples 25-31, wherein the real output value and the imaginary output value are each signed Q1.15 values.

33. A machine readable medium including code, when executed, to cause a machine to perform the methods of examples 9-16.

34. An apparatus comprising means to perform a method of any of examples 9-16.

35. A machine-readable storage including machine-readable instructions, when executed, to implement a method of any one of examples 9-16 or realise an apparatus of any one of examples 1-8 or 25-31.

The figures below detail exemplary architectures and systems to implement embodiments of the above. In some embodiments, one or more hardware components and/or instructions described above are emulated as detailed below, or implemented as software modules.

Instruction Sets

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an instruction set architecture (ISA) is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 58 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 5A illustrates an exemplary AVX instruction format including a VEX prefix 502, real opcode field 530, Mod R/M byte 540, SIB byte 550, displacement field 562, and IMM8 572. FIG. 5B illustrates which fields from FIG. 5A make up a full opcode field 574 and a base operation field 541. FIG. 5C illustrates which fields from FIG. 5A make up a register index field 544.

VEX Prefix (Bytes 0-2) 502 is encoded in a three-byte form. The first byte is the Format Field 539 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 505 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 515 (VEX byte 1, bits [4:0]-mmmmm) includes content to encode an implied leading opcode byte. W Field 564 (VEX byte 2, bit [7]-W)—is represented by the notation VEX.W, and provides different functions depending on the instruction. The role of VEX.vvvv 520 (VEX Byte 2, bits [6:3]-vvvv) may include the following: 1) VEX.vvvv encodes the first source register operand, specified in inverted (1 s complement) form and is valid for instructions with 2 or more source operands; 2) VEX.vvvv encodes the destination register operand, specified in is complement form for certain vector shifts; or 3) VEX.vvvv does not encode any operand, the field is reserved and should contain 1111*b*. If VEX.L 568 Size field (VEX byte 2, bit [2]-L)=0, it indicates 58 bit vector; if VEX.L=1, it indicates 256-bit vector. Prefix encoding field 525 (VEX byte 2, bits [1:0]-pp) provides additional bits for the base operation field 541.

Real Opcode Field 530 (Byte 3) is also known as the opcode byte. Part of the opcode is specified in this field.

MOD R/M Field 540 (Byte 4) includes MOD field 542 (bits [7-6]), Reg field 544 (bits [5-3]), and R/M field 546 (bits [2-0]). The role of Reg field 544 may include the following: encoding either the destination register operand or a source register operand (the rrr of Rrrr), or be treated as an opcode extension and not used to encode any instruction operand. The role of R/M field 546 may include the following: encoding the instruction operand that references a memory address, or encoding either the destination register operand or a source register operand.

Scale, Index, Base (SIB)—The content of Scale field 550 (Byte 5) includes SS 552 (bits [7-6]), which is used for memory address generation. The contents of SIB.xxx 554 (bits [5-3]) and SIB.bbb 556 (bits [2-0]) have been previously referred to with regard to the register indexes Xxxx and Bbbb.

The Displacement Field 562 and the immediate field (IMM8) 572 contain data.

Exemplary Register Architecture

Figure 6:
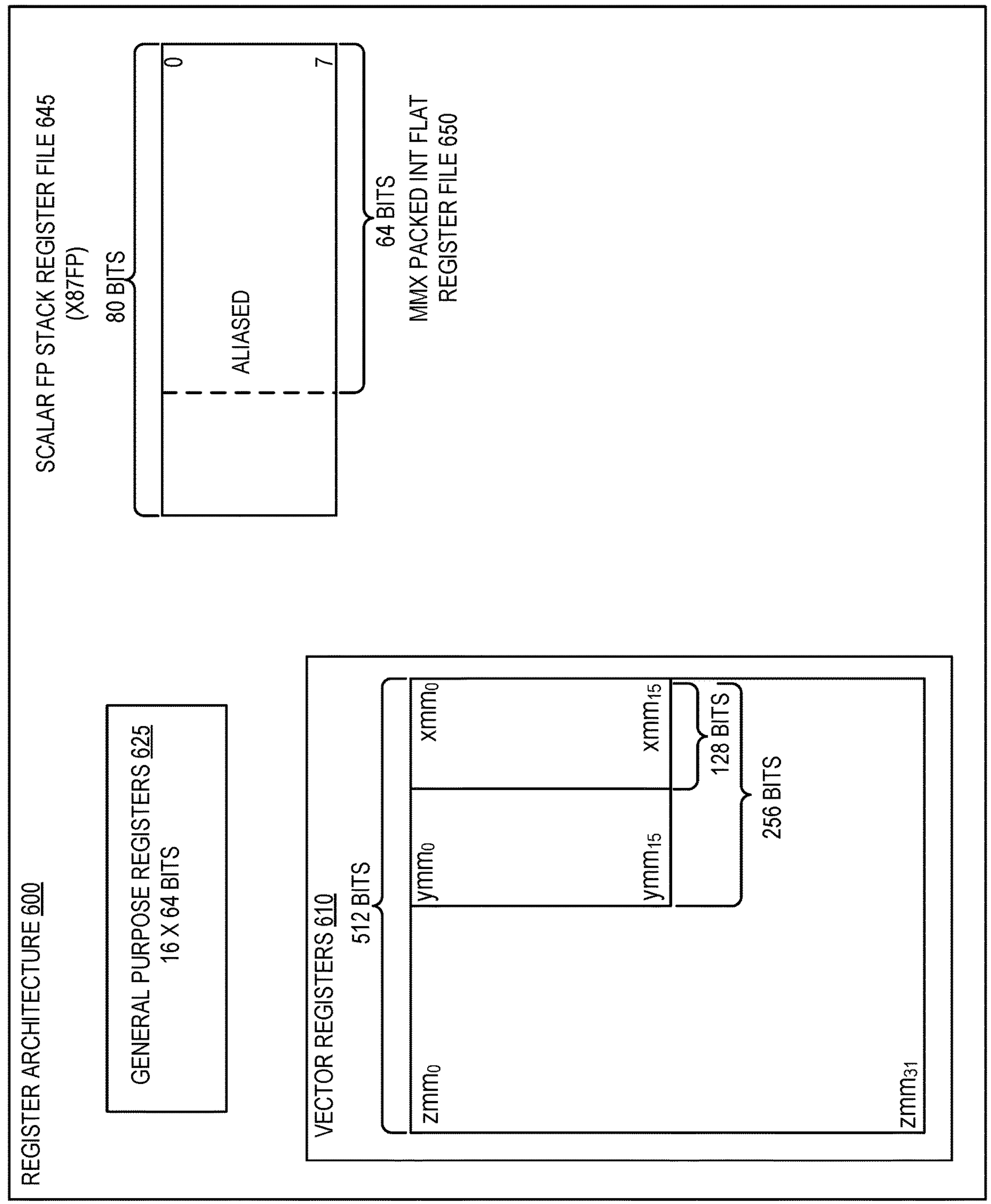
FIG. 6 is a block diagram of a register architecture according to some embodiments.

FIG. 6 is a block diagram of a register architecture 600 according to some embodiments. In the embodiment illustrated, there are 32 vector registers 610 that are 512 bits wide; these registers are referenced as zmm0 through zmm31. The lower order 256 bits of the lower 9 zmm registers are overlaid on registers ymm0-15. The lower order 128 bits of the lower 9 zmm registers (the lower order 128 bits of the ymm registers) are overlaid on registers xmm0-15.

General-purpose registers 625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 645, on which is aliased the MMX packed integer flat register file 650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, fewer, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a central processing unit (CPU) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

In-Order and Out-of-Order Core Block Diagram

Figures 7A, 7B:
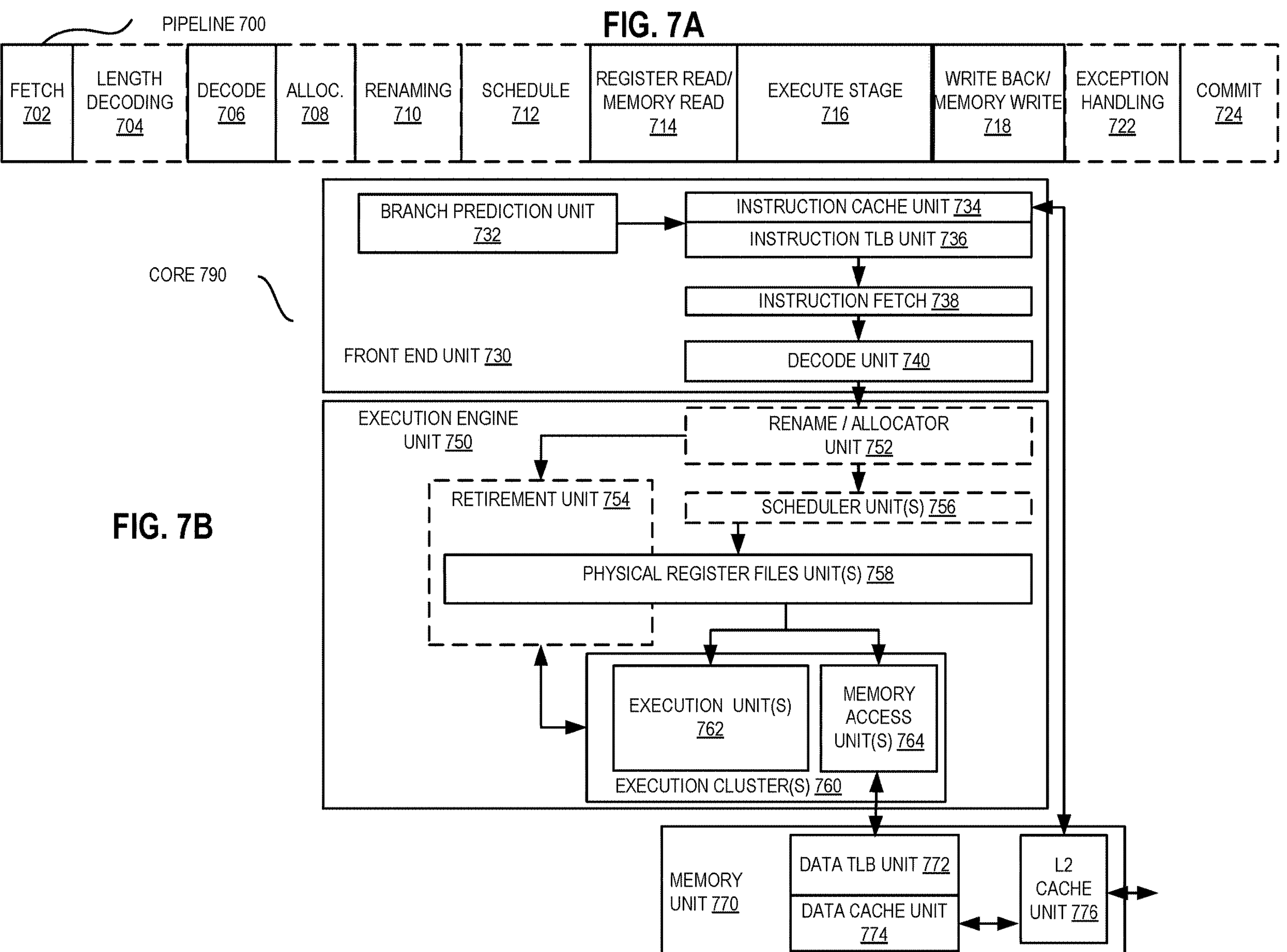
FIG. 7A is a block diagram illustrating both an exemplary in-order pipeline and an exemplary register renaming, out-of-order issue/execution pipeline according to embodiments.
FIG. 7B is a block diagram illustrating both an exemplary embodiment of an in-order architecture core and an exemplary register renaming, out-of-order issue/execution architecture core to be included in a processor according to some embodiments.

FIG. 7A is a block diagram illustrating both an exemplary in-order pipeline and an exemplary register renaming, out-of-order issue/execution pipeline according to some embodiments. FIG. 7B is a block diagram illustrating both an exemplary embodiment of an in-order architecture core and an exemplary register renaming, out-of-order issue/execution architecture core to be included in a processor according to some embodiments. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front-end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front-end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front-end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general-purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) on various types of data (e.g., scalar floating point, packed integer, packed floating point, vector integer, vector floating point). Execution units 762 may include DSP hardware, and may share a scheduler port with vector execution units and/or fused multiply-add (FMA) execution units.

While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: (1) the instruction fetch unit 738 performs the fetch and length decoding stages 702 and 704; (2) the decode unit 740 performs the decode stage 706; (3) the rename/allocator unit 752 performs the allocation stage 708 and renaming stage 710; (4) the scheduler unit(s) 756 performs the schedule stage 712; (5) the physical register file(s) unit(s) 758 and the memory unit 770 perform the register read/memory read stage 714; the execution cluster 760 perform the execute stage 716; (6) the memory unit 770 and the physical register file(s) unit(s) 758 perform the write back/memory write stage 718; (7) various units may be involved in the exception handling stage 722; and (8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 8B:
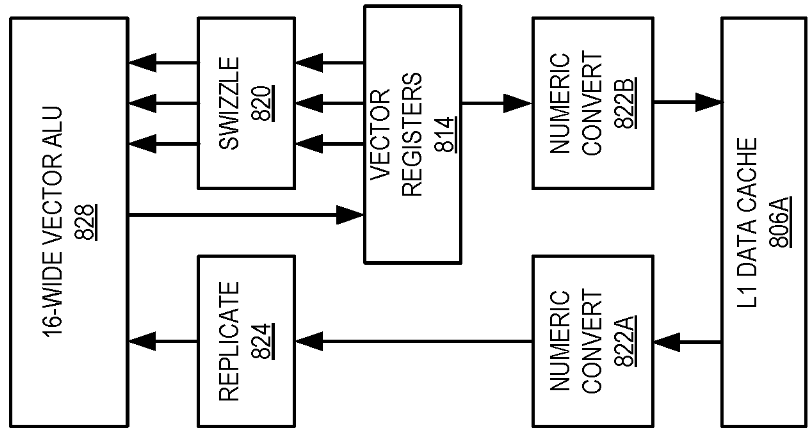
FIGS. 8A-8B illustrate a block diagram of a more specific exemplary in-order core architecture, which core would be one of several logic blocks (including other cores of the same type and/or different types) in a chip according to some embodiments.
Figure 8A:
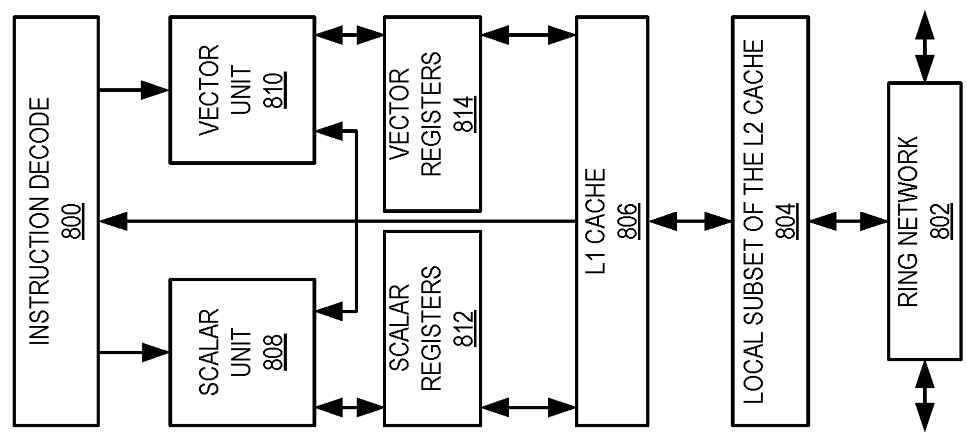

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory input/output (I/O) interfaces, and other necessary I/O logic, depending on the application.

FIG. 8A is a block diagram of a single processor core, along with its connection to the on-die interconnect network 802 and with its local subset of the Level 2 (L2) cache 804, according to some embodiments. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 8B is an expanded view of part of the processor core in FIG. 8A according to some embodiments. FIG. 8B includes an L1 data cache 806A part of the L1 cache 804, as well as more detail regarding the vector unit 810 and the vector registers 814. Specifically, the vector unit 810 is a 9-wide vector processing unit (VPU) (see the 16-wide Arithmetic Logic Unit (ALU) 828), which executes one or more of integer, single-precision float, and double-precision float instructions. The VPU supports swizzling the register inputs with swizzle unit 820, numeric conversion with numeric convert units 822A-B, and replication with replication unit 824 on the memory input.

Processor with Integrated Memory Controller and Graphics

Figure 9:
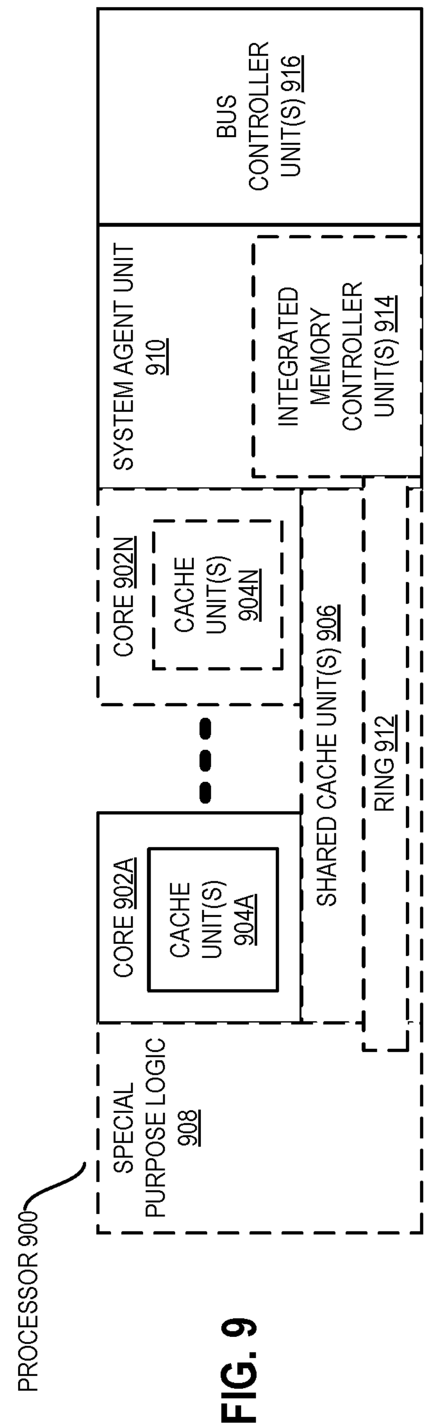
FIG. 9 is a block diagram of a processor that may have more than one core, may have an integrated memory controller, and may have integrated graphics according to some embodiments.

FIG. 9 is a block diagram of a processor 900 that may have more than one core, may have an integrated memory controller, and may have integrated graphics according to some embodiments. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores 904A-N, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
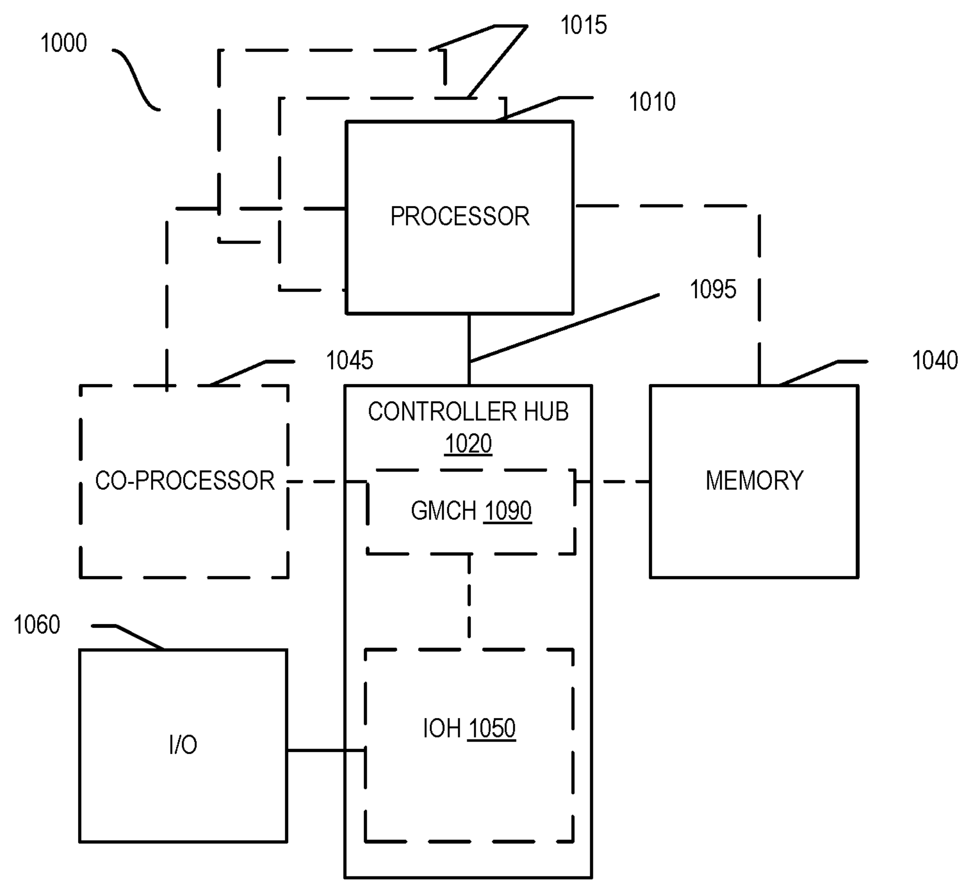
FIG. 10 is a block diagram of a system in accordance with some embodiments.

Referring now to FIG. 10, shown is a block diagram of a system 1000 in accordance with some embodiments. The system 1000 may include one or more processors 1010, 1015, which are coupled to a controller hub 1020. In one embodiment, the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random-access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface, or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 10155 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
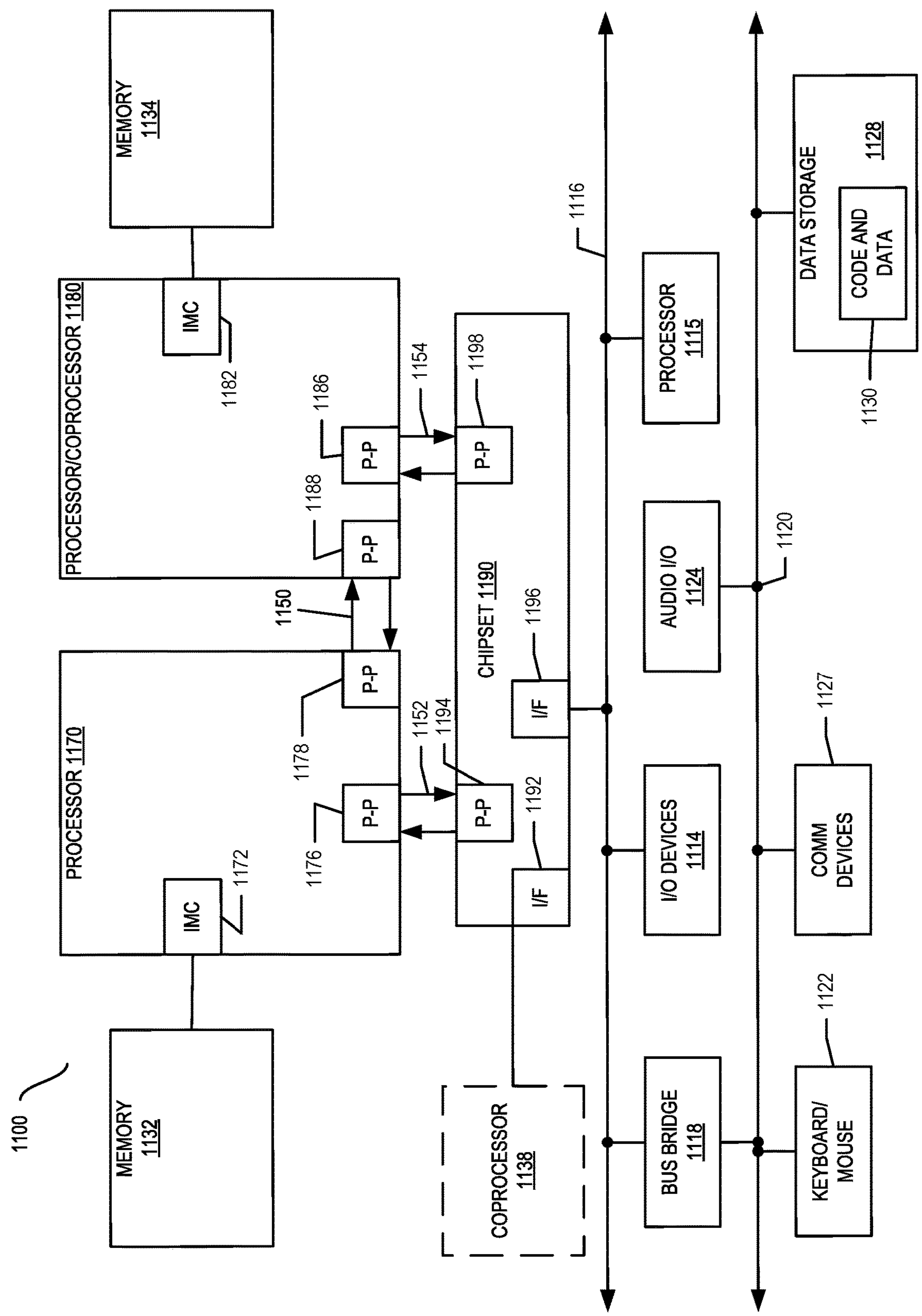
FIG. 11 is a block diagram of a first more specific exemplary system in accordance with some embodiments.

Referring now to FIG. 11, shown is a block diagram of a first more specific exemplary system 1100 in accordance with some embodiments. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In some embodiments, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes, as part of its bus controller units, point-to-point (P-P) interfaces 1176 and 1178; similarly, second processor 1180 includes P-P interfaces 1186 and 1188. Processors 1170, 1180 may exchange information via a point-to-point (P-P) interconnect 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1192. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another I/O interconnect bus, although other options exist that may be known to those of skill in the art.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1116. Note that other architectures are possible. For example, instead of the point-to-point architecture of FIG. 11, a system may implement a multi-drop bus or other such architecture.

Figure 12:
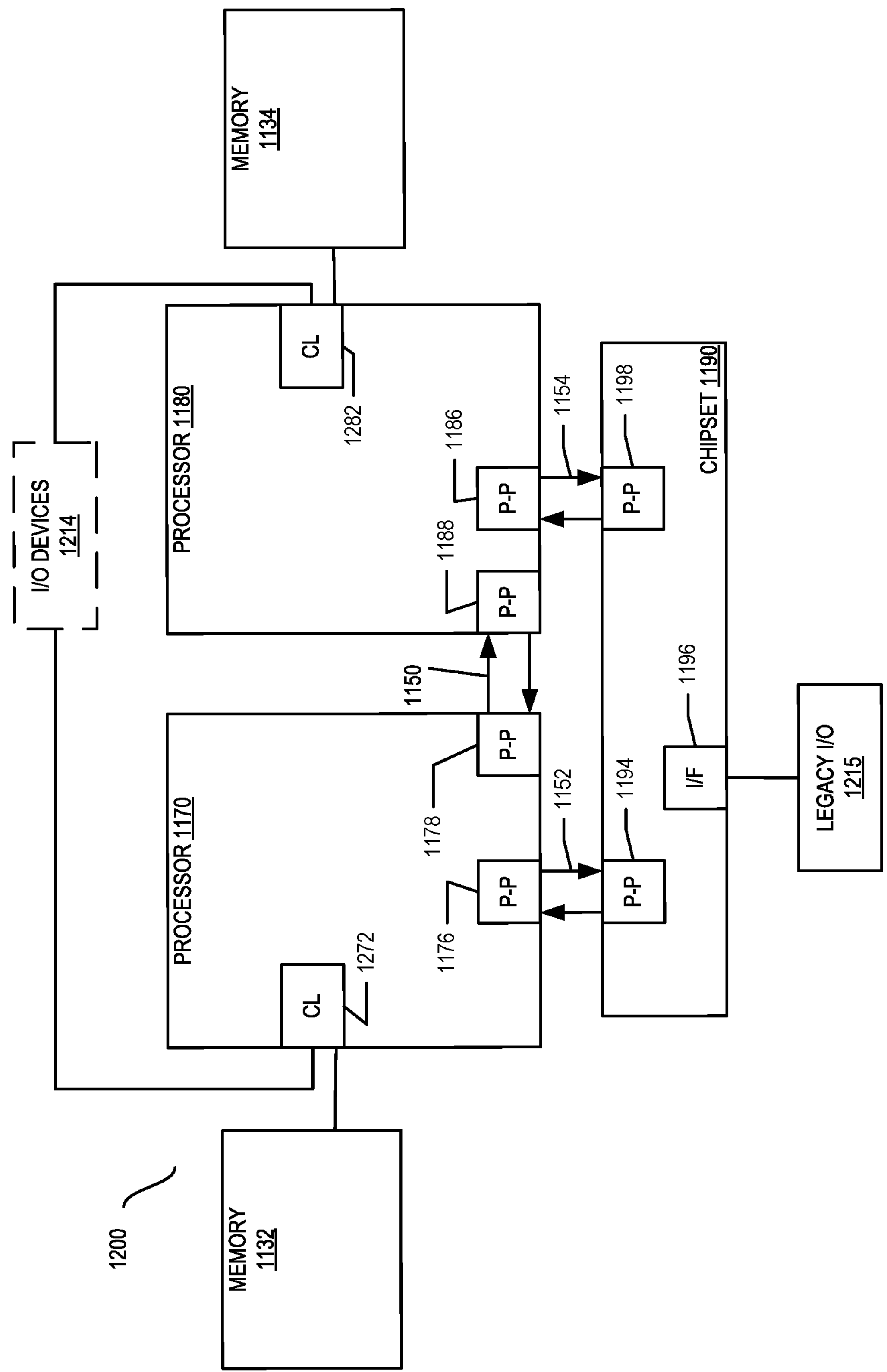
FIG. 12 is a block diagram of a second more specific exemplary system in accordance with some embodiments.

Referring now to FIG. 12, shown is a block diagram of a second more specific exemplary system 1200 in accordance with some embodiments Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1272 and 1282, respectively. Thus, the CL 1272, 1282 include integrated memory controller units and include I/O control logic. FIG. 12 illustrates that not only are the memories 1132, 1134 coupled to the CL 1272, 1282, but also that I/O devices 1214 are also coupled to the CL 1272, 1282. Legacy I/O devices 1215 are coupled to the chipset 1190.

Figure 13:
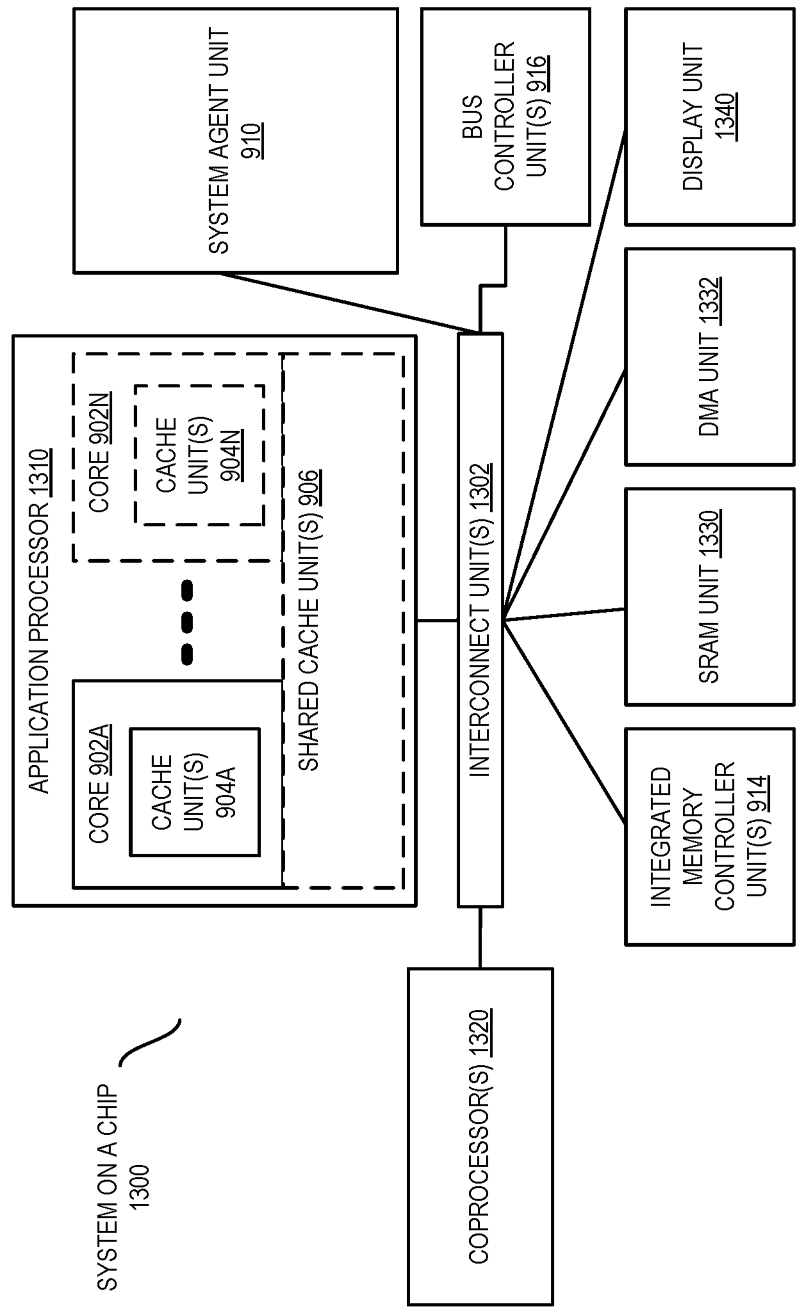
FIG. 13 is a block diagram of a SoC in accordance with some embodiments.

Referring now to FIG. 13, shown is a block diagram of a SoC 1300 in accordance with some embodiments. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 132A-N, cache units 904A-N, and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
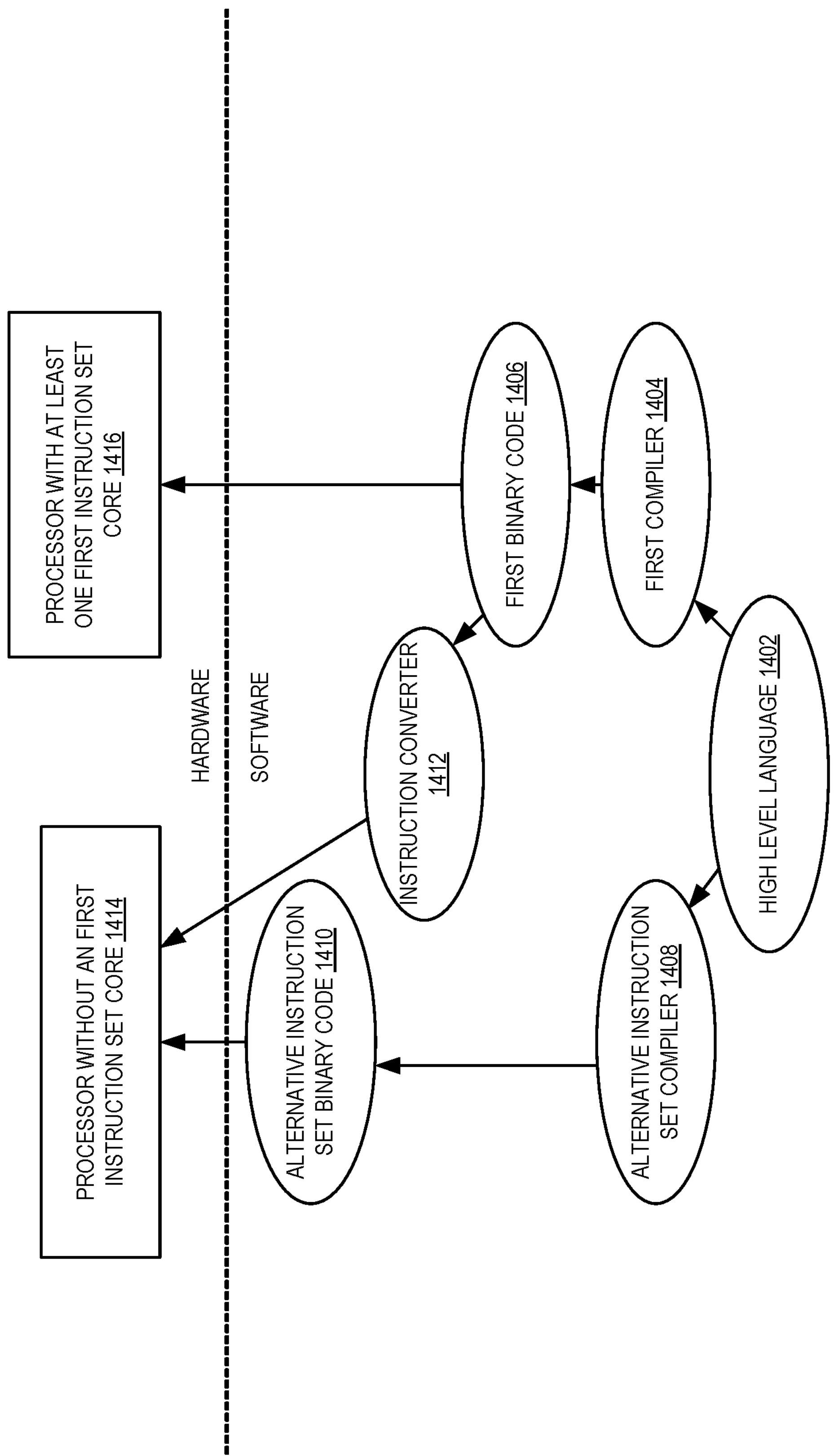
FIG. 14 is a block diagram contrasting the use of a software instruction converter to convert binary instructions in a source instruction set to binary instructions in a target instruction set according to some embodiments.

FIG. 14 is a block diagram contrasting the use of a software instruction converter to convert binary instructions in a source instruction set to binary instructions in a target instruction set according to some embodiments. In the illustrated embodiment, the instruction converter is a software instruction converter, although alternatively the instruction converter may be implemented in software, firmware, hardware, or various combinations thereof. FIG. 14 shows a program in a high-level language 1402 may be compiled using a first compiler 1404 to generate a first binary code (e.g., x86) 1406 that may be natively executed by a processor with at least one first instruction set core 1416. In some embodiments, the processor with at least one first instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1404 represents a compiler that is operable to generate binary code of the first instruction set 1406 (e.g., object code) that can, with or without additional linkage processing, be executed on the processor with at least one first instruction set core 1416. Similarly, FIG. 14 shows the program in the high-level language 1402 may be compiled using an alternative instruction set compiler 1408 to generate alternative instruction set binary code 1410 that may be natively executed by a processor without at least one first instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the first binary code 1406 into code that may be natively executed by the processor without a first instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have a first instruction set processor or core to execute the first binary code 1406.

What is claimed is:

1. An apparatus comprising:

a decoder to decode an instruction having fields for a packed data source operand, a packed data destination operand, and an immediate value, and execution circuitry to execute the decoded instruction to:

compute at least a real output value and an imaginary output value based on at least a cosine calculation and a sine calculation, wherein the cosine and sine calculations are each based on an index value from the packed data source operand;

add the index value with an index increment value from the packed data source operand to create an updated index value; and store the real output value, the imaginary output value, and the updated index value to the packed data destination operand.

2. The apparatus of claim 1, wherein:

the cosine calculation includes generating a cosine of a theta value, the theta value being based on the index value and a value of pi;

the sine calculation includes generating a sine of the theta value; and the computation is based on the cosine calculation result, the sine calculation result, and an imaginary number, wherein the imaginary number is the square root of negative one.

3. The apparatus of claim 1, wherein:

the cosine and sine calculations are further based on an imaginary component control value from the immediate value and a real component control value from the immediate value;

the imaginary component control value indicates whether an imaginary component of the computation is to be negated and whether the imaginary component of the computation is to include the cosine calculation or the sine calculation; and the real component control value indicates whether a real component of the computation is to be negated and whether the real component of the computation is to include the cosine calculation or the sine calculation.

4. The apparatus of claim 1, wherein the execution circuitry, to compute at least the real output value and the imaginary output value, is further to:

scale an intermediate real output value and an intermediate imaginary output value by a value of one-half (½) responsive to a scaling value of the immediate value having a first value to create the real output value and the imaginary output value.

5. The apparatus of claim 1, wherein the execution circuitry is further to store the real output value and the imaginary output value at a location within the packed data destination operand based on an output selector value of the immediate value.

6. The apparatus of claim 5, wherein:

when the output selector value is a first value, the real output value and the imaginary output value are stored in a low quadword of the packed data destination operand; and when the output selector value is a second value, the real output value and the imaginary output value are stored in a high quadword of the packed data destination operand.

7. The apparatus of claim 5, wherein the execution circuitry is further to:

compute a negative real output value and a negative imaginary output value; and store the negative real output value and the negative imaginary output value within the packed data destination operand.

8. The apparatus of claim 1, wherein the real output value and the imaginary output value are each signed Q1.15 values.

9. A method comprising:

decoding an instruction having fields for a packed data source operand, a packed data destination operand, and an immediate value, and executing the decoded instruction to:

compute at least a real output value and an imaginary output value based on at least a cosine calculation and a sine calculation, wherein the cosine and sine calculations are each based on an index value from the packed data source operand;

add the index value with an index increment value from the packed data source operand to create an updated index value; and store the real output value, the imaginary output value, and the updated index value to the packed data destination operand.

10. The method of claim 9, wherein:

the cosine calculation includes generating a cosine of a theta value, the theta value being based on the index value and a value of pi;

the sine calculation includes generating a sine of the theta value; and the computation is based on the cosine calculation result, the sine calculation result, and an imaginary number, wherein the imaginary number is the square root of negative one.

11. The method of claim 9, wherein:

the cosine and sine calculations are further based on an imaginary component control value from the immediate value and a real component control value from the immediate value;

the imaginary component control value indicates whether an imaginary component of the computation is to be negated and whether the imaginary component of the computation is to include the cosine calculation or the sine calculation; and the real component control value indicates whether a real component of the computation is to be negated and whether the real component of the computation is to include the cosine calculation or the sine calculation.

12. The method of claim 9, wherein the computation of at least the real output value and the imaginary output value includes:

scaling an intermediate real output value and an intermediate imaginary output value by a value of one-half (½) responsive to a scaling value of the immediate value having a first value to create the real output value and the imaginary output value.

13. The method of claim 9, wherein the execution further comprises storing the real output value and the imaginary output value at a location within the packed data destination operand based on an output selector value of the immediate value.

14. The method of claim 13, wherein:

when the output selector value is a first value, the real output value and the imaginary output value are stored in a low quadword of the packed data destination operand; and when the output selector value is a second value, the real output value and the imaginary output value are stored in a high quadword of the packed data destination operand.

15. The method of claim 13, wherein the execution further comprises:

computing a negative real output value and a negative imaginary output value; and storing the negative real output value and the negative imaginary output value within the packed data destination operand.

16. The method of claim 9, wherein the real output value and the imaginary output value are each signed Q1.15 values.

17. A non-transitory machine-readable medium storing an instruction which, when executed by a processor, causes the processor to perform a method, the method comprising:

decoding an instruction having fields for a packed data source operand, a packed data destination operand, and an immediate value, and executing the decoded instruction to:

compute at least a real output value and an imaginary output value based on at least a cosine calculation and a sine calculation, wherein the cosine and sine calculations are each based on an index value from the packed data source operand;

add the index value with an index increment value from the packed data source operand to create an updated index value; and store the real output value, the imaginary output value, and the updated index value to the packed data destination operand.

18. The non-transitory machine-readable medium of claim 17, wherein:

the cosine calculation includes generating a cosine of a theta value, the theta value being based on the index value and a value of pi;

the sine calculation includes generating a sine of the theta value; and the computation is based on the cosine calculation result, the sine calculation result, and an imaginary number, wherein the imaginary number is the square root of negative one.

19. The non-transitory machine-readable medium of claim 17, wherein:

the cosine and sine calculations are further based on an imaginary component control value from the immediate value and a real component control value from the immediate value;

the imaginary component control value indicates whether an imaginary component of the computation is to be negated and whether the imaginary component of the computation is to include the cosine calculation or the sine calculation; and the real component control value indicates whether a real component of the computation is to be negated and whether the real component of the computation is to include the cosine calculation or the sine calculation.

20. The non-transitory machine-readable medium of claim 17, wherein the computation of at least the real output value and the imaginary output value includes:

scaling an intermediate real output value and an intermediate imaginary output value by a value of 2 responsive to a scaling value of the immediate value having a first value to create the real output value and the imaginary output value.

* * * * *